US008339459B2

(12) United States Patent
Zhang et al.

(10) Patent No.: US 8,339,459 B2
(45) Date of Patent: Dec. 25, 2012

(54) MULTI-CAMERA HEAD POSE TRACKING

(75) Inventors: Zhengyou Zhang, Bellevue, WA (US); Aswin Sankaranarayanan, Greenbelt, MD (US); Qing Zhang, Lexington, KY (US); Zicheng Liu, Bellevue, WA (US); Qin Cai, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 510 days.

(21) Appl. No.: 12/561,154

(22) Filed: Sep. 16, 2009

(65) Prior Publication Data
US 2011/0063403 A1 Mar. 17, 2011

(51) Int. Cl.
H04N 5/225 (2006.01)
(52) U.S. Cl. .......... 348/169; 348/14.1; 382/103
(58) Field of Classification Search .......... 348/169, 348/14.1; 382/103
See application file for complete search history.

(56) References Cited

U.S. PATENT DOCUMENTS

| 6,064,749 | A  | * | 5/2000  | Hirota et al. ........... 382/103 |
| 7,043,056 | B2 | * | 5/2006  | Edwards et al. ........ 382/103 |
| 7,508,979 | B2 | * | 3/2009  | Comaniciu et al. ..... 382/154 |
| 7,515,173 | B2 |   | 4/2009  | Zhang et al. |
| 8,077,914 | B1 | * | 12/2011 | Kaplan ................... 382/103 |
| 2003/0218672 | A1 | * | 11/2003 | Zhang et al. ........ 348/14.16 |
| 2004/0017472 | A1 | * | 1/2004  | Gorodnichy ............ 348/169 |
| 2004/0105573 | A1 |   | 6/2004  | Neumann et al. |
| 2006/0187305 | A1 | * | 8/2006  | Trivedi et al. .......... 348/169 |
| 2008/0291278 | A1 |   | 11/2008 | Zhang et al. |
| 2008/0297589 | A1 |   | 12/2008 | Kurtz et al. |
| 2009/0022364 | A1 |   | 1/2009  | Swaminathan et al. |
| 2011/0002508 | A1 | * | 1/2011  | Basso et al. ............ 382/103 |

OTHER PUBLICATIONS

Aggarwal, et al., "3D Facial Pose Tracking in Uncalibrated Videos", retrieved on Jun. 23, 2009 at <<http://www.umiacs.umd.edu/~rama/Conf.pdf-files/3dTracking2005.pdf>>, University of Maryland, 6 pages.
Ba, et al., "Probabilistic Head Pose Tracking Evaluation in Single and Multiple Camera Setups", retrieved on Jun. 23, 2009 at <<http://www.idiap.ch/~odobez/publications/BaOdobezCLEAR-2007.pdf>>, CLEAR 2007 Workshop, May 2007, pp. 1-10.
Cootes, et al., "Active Shape Models—Their Training and Application", retrieved on Jun. 23, 2009 at <<http://bagpuss.smb.man.ac.uk/~bim/Papers/cviu95.pdf>>, Computer Vision and Image Understanding, Academic Press, vol. 61, No. 1, Jan. 1995, pp. 38-59.
Cordea, et al., "3D Head Pose Recovery for Interactive Virtual Reality Avatars", retrieved on Jun. 23, 2009 at <<http://www.site.uottawa.ca/%7Epetriu/TrIM02-Head3D.pdf>>, IEEE Transactions on Instrumentation and Measurement, vol. 51, No. 4, Aug. 2002, pp. 640-644.

(Continued)

*Primary Examiner* — Abdullahi Salad
(74) *Attorney, Agent, or Firm* — Lee & Hayes, PLLC

(57) ABSTRACT

Techniques and technologies for tracking a face with a plurality of cameras wherein a geometry between the cameras is initially unknown. One disclosed method includes detecting a head with two of the cameras and registering a head model with the image of the head (as detected by one of the cameras). The method also includes back projecting the other detected face image to the head model and determining a head pose from the back-projected head image. Furthermore, the determined geometry is used to track the face with at least one of the cameras.

20 Claims, 12 Drawing Sheets

Calibrating Camera Related Geometry

OTHER PUBLICATIONS

David, et al., "Simultaneous Pose and Correspondence Determination using Line Features", retrieved on Jun. 23, 2009 at <<http://ieeexplore.ieee.org/stamp/stamp.jsp?tp=&arnumber=1211499&isnumber=27266>>, Proceedings of the 2003 IEEE Computer Society Conference on Computer Vision and Pattern Recognition (CVPR 2003), IEEE, 2003, pp. 1-8.

Edwards, et al., "Interpreting Face Images using Active Appearance Models", retrieved on Jun. 23, 2009 at <<http://www.ai.mit.edu/courses/6.899/papers/aamFG98.pdf>>, Wolfson Image Analysis Unit, Department of Medical Biophysics, University of Manchester, pp. 1-6.

Fua, "Regularized Bundle-Adjustment to Model Heads from Image Sequences without Calibration Data", retrieved on Jun. 23, 2009 at <<http://cvlab.epfl.ch/publications/publications/2000/Fua00.pdf>>, International Journal of Computer Vision, vol. 38, No. 2, Jul. 2000, pp. 1-28.

Gatica-Perez, et al., "Audio-visual probabilistic tracking of multiple speakers in meetings", retrieved on Jun. 23, 2009 at <<http://www.idiap.ch/~mccowan/publications/gatica-sap06.pdf>>, May 4, 2006, pp. 1-35.

Jiao, et al., "Face Alignment Using Statistical Models and Wavelet Features", retrieved on Jun. 23, 2009 at <<http://ieeexplore.ieee.org/stamp/stamp.jsp?tp=&arnumber=1211370&isnumber=27265>>, Proceedings of the 2003 IEEE Computer Society Conference on Computer Vision and Pattern Recognition (CVPR 2003), IEEE, 2003, pp. 1-7.

Lepetit, et al., "Monocular Model-Based 3D Tracking of Rigid Objects: A Survey", retrieved on Jun. 23, 2009 at <<http://cvlab.epfl.ch/publications/publications/2005/LepetitF05.pdf>>, Foundations and Trends in Computer Graphics and Vision, vol. 1, No. 1, 2005, 2 title pages and pp. 1-89.

Lowe, "Object Recognition from Local Scale-Invariant Features", retrieved on Jun. 23, 2009 at <<http://www.cs.ubc.ca/-lowe/papers/iccv99.pdf>>, Proceedings of the International Conference on Computer Vision, Corfu, Sep. 1999, pp. 1-8.

Lucas, et al., "An Iterative Image Registration Technique with an Application to Stereo Vision", retrieved on Jun. 23, 2009 at <<http://ijcai.org/Past%20Proceedings/IJCAI-81-VOL-2/PDF/017.pdf>>, Computer Science Department, Carnegie-Mellon University, pp. 674-679.

Moon, et al., "3D Object Tracking Using Shape-Encoded Particle Propagation", retrieved on Jun. 23, 2009 at <<http://citeseerx.ist.psu.edu/viewdoc/download;jsessionid=A566DBF867A94A4453F19448CAA32EA4?doi=10.1.1.20.8834&rep=rep1&type=pdf>>, Center for Automation Research and Department of Electrical and Computer Engineering, University of Maryland, 8 pages.

Ng, et al., "Multi-View Face Detection and Pose Estimation Using a Composite Support Vector Machine across the View Sphere", retrieved on Jun. 23, 2009 at <<http://citeseer.ist.psu.edu/cache/papers/cs/11824/http:zSzzSzwww.dcs.qmw.ac.ukzSz~sggzSzpaperszSzratfg-rts99-Ng-Gong.pdf/ng99multiview.pdf>>, Department of Computer Science, Queen Mary and Westfield College.

Preteux, et al., "Model-Based Head Tracking and 3D Pose Estimation", retrieved on Jun. 23, 2009 at <<http://citeseerx.ist.psu.edu/viewdoc/download?doi=10.1.1.108.6332&rep=rep1&type=pdf>>, Departement Signal et Image, Institut National des Telecommunications, 15 pages.

Ruddarraju, et al., "Fast Multiple Camera Head Pose Tracking", retrieved on Jun. 23, 2009 at <<http://www.cc.gatech.edu/cpl/projects/multicameyetracking/papers/paper1.pdf>>, Georgia Institute of Technology, 7 pages.

Tao, et al., "Explanation-based Facial Motion Tracking Using a Piecewise Bezier Volume Deformation Model", retrieved on Jun. 23, 2009 at <<http://ieeexplore.ieee.org/stamp/stamp.jsp?tp=&arnumber=787002&isnumber=17045>>, Image Processing and Formation Laboratory, Beckman Institute, University of Illinois at Urbana-Champaign, IEEE, 1999, pp. 611-617.

Tariq, et al., "A Multi-Camera 6DOF Pose Tracker", retrieved on Jun. 23, 2009 at <<http://ieeexplore.ieee.org/stamp/stamp.jsp?tp=&arnumber=1383084&isnumber=30137>>, Proceedings of the Third IEEE and ACM International Symposium on Mixed and Augmented Reality (ISMAR 2004), IEEE, 2004, 2 pages.

Vacchetti, et al., "Stable Real-Time 3D Tracking Using Online and Offline Information", retrieved on Jun. 23, 2009 at <<http://cvlab.epfl.ch/publications/publications/2004/VacchettiLF04.pdf>>, Computer Vision Lab, Swiss Federal Institute of Technology, pp. 1-11.

Voit, et al., "Tracking Head Pose and Focus of Attention with Multiple Far-field Cameras", retrieved on Jun. 23, 2009 at <<http://delivery.acm.org/10.1145/1190000/1181050/p281-voit.pdf?key1=1181050&key2=3502095421&coll=GUIDE&dl=GUIDE&CFID=41292822&CFTOKEN=79973694>>, ICMI 2006, ACM, 2006, pp. 281-286.

Wang, et al., "Face Re-Lighting from a Single Image under Harsh Lighting Conditions", retrieved on Jun. 23, 2009 at <<http://ieeexplore.ieee.org/stamp/stamp.jsp?tp=&arnumber=4270131&isnumber=4269956>>, IEEE, 2007, 8 pages.

Wang, et al., "Real-Time Bayesian 3D Pose Tracking", retrieved on Jun. 23, 2009 at <<http://ieeexplore.ieee.org/stamp/stamp.jsp?arnumber=04016113>>, IEEE Transactions on Circuits and Systems for Video Technology, vol. 16, No. 12, Dec. 2006, pp. 1533-1541.

Winder, et al., "Learning Local Image Descriptors", retrieved on Jun. 23, 2009 at <<http://ieeexplore.ieee.org/stamp/stamp.jsp?tp=&arnumber=4269996&isnumber=4269956>>, IEEE, 2007, 8 pages.

Yang, et al., "Eye Gaze Correction with Stereovision for Video-Teleconferencing", retrieved on Jun. 23, 2009 at <<http://research.microsoft.com/en-us/um/people/zhang/papers/tr01-119.pdf>>, Technical Report, MSR-TR-2001-119, Dec. 2001, 15 pages.

* cited by examiner

Teleconferencing/Tele-Presence System

Estimating Head Pose

Aligning Multi-Camera Head Poses

Estimating Raw Head Pose

Head Tracking

Calibrating Camera Related Geometry

MULTI-CAMERA HEAD POSE TRACKING

BACKGROUND

Single camera head tracking systems occasionally "lose track" of the subject (whose head the system is tracking) as the subject moves and/or the viewed scene changes. For instance, the subject may turn from the camera thereby causing the back of the subject's head to face the camera. Because the back of the head, as compared to the face, includes relatively few detectable features, the system may not be able to identify the head well enough to track the head. Moreover, at times the subject might move behind or otherwise become occluded by some object. Again, as a result, the system can lose track of the head. The system may also drift from accurately detecting the subject's head (and its position, pose, etc.) due to accumulated error within an algorithm estimating the position of the head (and/or for other reasons). Indeed, at some point, the detected position of the head might differ sufficiently from the actual position of the head that the system begins focusing on (or otherwise operating upon) other aspects of the scene. Moreover, this result might occur even when the subject remains stationary.

Multi-camera systems partially alleviate some of the challenges associated with these single-camera systems. However, these multi-camera systems carry with them certain complexities which offset many of their advantages. For instance, while multi-camera systems possess better overall abilities to perform head tracking, these multi-camera systems require accurate knowledge of the geometry between the cameras (i.e., the relative positions and the relative orientations of the cameras). Obtaining that information can be difficult and time consuming, particularly when the multi-camera system views a large area.

As difficult as obtaining information regarding the camera related geometry may be, maintaining that information poses perhaps even greater challenges. For instance, the user might intentionally move one or more of the cameras. In which case, the user may have to recalibrate the tracking algorithms which relate information obtained by one camera to information obtained from the other cameras. In addition, or in the alternative, the user might unintentionally move one of the cameras or some other event (for instance, malicious tampering with the system) might cause the camera related geometry to change. No matter the cause of the change, the user must re-calibrate the system to eliminate the errors, malfunctions, etc. associated with the change to the camera related geometry.

SUMMARY

The following presents a simplified summary in order to provide a basic understanding of some aspects of the disclosed subject matter. This summary is not an extensive overview of the disclosed subject matter, and is not intended to identify key/critical elements or to delineate the scope of such subject matter. A purpose of the summary is to present some concepts in a simplified form as a prelude to the more detailed description that is presented later.

Techniques and technologies for tracking a head with multiple cameras are provided wherein a camera related geometry is at least initially uncalibrated. One disclosed method includes detecting a head in images captured with two of the cameras and registering a head model with one of the images of the head. The method also includes back-projecting the other image of the head to the head model and determining a head pose from the back-projected head image.

To the accomplishment of the foregoing and related ends, certain illustrative aspects are described herein in connection with the following description and the annexed drawings. These aspects are indicative of various ways in which the disclosed subject matter may be practiced, all of which are intended to be within the scope of the disclosed subject matter. Other advantages and novel features may become apparent from the following detailed description when considered in conjunction with the drawings.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

Figure 1:
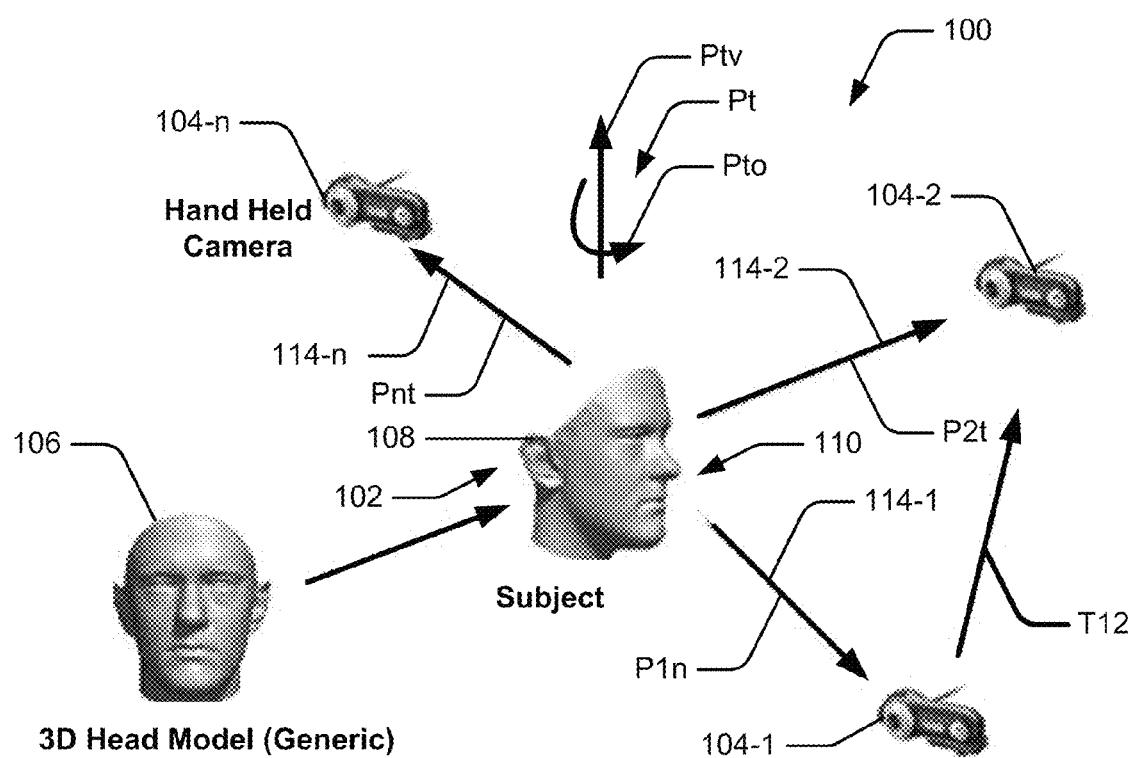
FIG. 1 is an illustrative schematic diagram of a multi-camera head tracking system.

This document describes techniques and technologies for multi-camera head tracking and, more particularly, this document describes techniques and technologies for multi-camera head tracking using head tracking systems in which a camera related geometry is at least initially uncalibrated.

In general, machine vision has lead to abilities to extract and understand information presented in scenes viewed by cameras. For instance, the ability to extract a head pose from a scene allows machine vision systems to re-light a person's face, correct their gaze, create adaptive displays from the captured image, etc. even while the subject moves about the scene. Many other benefits flow from the ability to extract a head pose from a scene. For instance, the availability of the head pose enables model-based compression of the image (or video feed) containing images of the head. This document discloses embodiments with improved head pose extraction capabilities.

Embodiments disclosed herein include multi-camera head tracking systems and methods which provide robust real-time head tracking, particularly in situations in which the subject of interest is severely occluded (as viewed by one or more of the cameras). These embodiments increase the working range of the cameras used to track the head as well as increasing the reliability with which heads can be tracked.

Some embodiments use key-frames to improve the head tracking capabilities of these systems and methods. Some of these embodiments can also use the key-frames obtained from one camera to establish key-frames for other cameras. Embodiments also deliver drift-free head tracking capabilities and fast feature matching across cameras and over time. Moreover, embodiments determine the camera related geometry without requiring physically measuring or calibrating the same. Accordingly, embodiments deliver more accurate head pose estimates, wider tracking ranges, and improved tracking reliability than heretofore possible while also reducing system complexity, cost, etc.

This document also discloses embodiments which provide real-time methods for extracting head poses from scenes using multiple views of the subject(s) of interest and using generic 3-D (three dimensional) models of these subjects. Moreover, these embodiments allow estimating the head poses without obtaining correspondence between the multiple views and without requiring apriori knowledge of the camera related geometry. Some of these embodiments allow for the use of models of the subjects wherein the models include rich feature sets. For instance, in embodiments wherein a person's head is the object to be tracked, embodiments use a model of the head that includes features besides the restrictive sets of features (i.e., predefined features such as eyes, mouths, etc.) of previously available head models.

Some embodiments provide 3D (three dimensional) head pose information in real-time, from multiple cameras, and with uncalibrated relative geometry between cameras. The relative camera geometry includes the distance(s) between cameras, the angles there between, and the orientations of the cameras relative to the orientations of the other cameras (or relative to some pre-defined orientation). Such embodiments can be applied in situations heretofore impractical for either single-camera systems or multi-camera systems that require either apriori knowledge of the relative camera geometry or calibration (or measurement) of that geometry. These situations include monitoring large-scale environments and applications in which one of the cameras might be moved (for instance, to improve system performance).

Various embodiments provide methods of tracking heads. The methods of these embodiments include detecting a head in at least two images captured by different cameras. Moreover, the cameras involved have a geometry (relative positions, orientations, etc.) related to them which is at least initially uncalibrated. These methods also include registering a model of a head (which can be a generic model) with one of the captured images of the head. In some embodiments, the registering of the head model includes rescaling and/or re-orienting the head model. Furthermore, in some embodiments, the second detected head image is back-projected to the head model. Furthermore, some embodiments include determining the head pose from the back-projected image. As desired, portions of the method can be repeated to (re-)calibrate the head pose should the system lose track.

In some embodiments, these methods also include determining a key-frame from the first image in which the head is detected. The key-frame is of course therefore associated with the camera which captured the image from which the key-frame originated. Additionally, the key-frame can be associated with a corresponding image captured by a different camera and at about the same time as the image from which the key-frame arose. Another key-frame associated with the other camera can therefore be established as a result.

In various embodiments, certain methods include detecting that one of the cameras has lost track of the head. These methods include detecting the head in an image captured by a third camera, comparing that image of the head to the head model, and establishing a third key-frame associated with the third camera. Such situations might arise when the head leaves the field of view of the camera which lost tracking. Moreover, some of these embodiments use knowledge of a movement of the head (as viewed by one camera) to predict and track the movement of the head (as seen by another camera). In some of these embodiments, that knowledge includes knowledge regarding a smoothness of the movement of the head. Moreover, the predicted movement can be such that it should bring the head into the field of view of the other camera.

In the alternative, or in addition, some embodiments include detecting a motion of one of the cameras and invalidating the camera related geometry as a result. Furthermore, knowledge of the geometry between various other cameras can be used in these methods to re-calibrate the geometry related to a camera which has been moved.

Some embodiments provide computing devices and/or systems for performing the foregoing methods as well as other methods. Some of these computing devices and systems include displays for displaying the head while the systems or devices track the head pose. Some of these systems are within teleconferencing facilities and some of these systems are telepresence based systems. Moreover, in some embodiments, at least one of the cameras is a handheld camera subject to intentional and/or unintentional movements.

In some embodiments, the system includes at least a pair of cameras with fields of view (or axes) intersecting at an expected location of the subject (or of the subject's head) and which form an approximate right angle. Accordingly, one of the cameras might have a frontal view of the subject while the other camera might have a side view of the subject. Regardless of the views of the cameras, the system can estimate the angle between the fields of view of the cameras.

FIG. 1 is an illustrative schematic diagram of a multi-camera head tracking system 100. The system 100 typically focuses on one or more subjects 102 with a plurality of cameras 104-1 to 104-n. Additionally, the system 100 includes a 3D head model 106 while the subject 102, of course (where the subject is a human 102), includes a head 108. As will be further discussed herein, the head 108 includes a face 110 and other visible features. FIG. 1 also illustrates a relationship between the views of the head 108 obtained by the cameras 104-1 to 104-n and the head model 106.

In FIG. 1, the subject 102 (i.e., the subject's head 108) has a pose which presents a generally frontal view to the camera 104-1, a generally side view to the camera 104-2, and a generally rear view to the camera 104-n. The head pose $P_t$ of course, is defined by the position and the orientation of the head 108 in three-dimensional space at some particular time. Furthermore, FIG. 1 also illustrates the head pose $P_t$ with two arrows $P_{tv}$ and $P_{to}$. One arrow $P_{tv}$ points in a direction generally defined by the center of the head 108 and its crown thereby indicating a "vertical" associated with the head. The other, curved, arrow $P_{to}$ indicates a rotational orientation about that vertical which is defined by the direction which the head 108 faces.

Moreover, the subject 102 illustrated in FIG. 1 happens to be a person although any object could be the subject 102 (so long as a 3D model is available of objects of the same or a similar type). Tracking the head 108 in the current embodiment includes determining the head pose $P_t$ (the local vertical and rotational orientation or similar indications) which the head 108 assumes as the subject 102 moves among the scene (or as it remains stationary).

Some other aspects of the subject 102 which might be pertinent to various embodiments of the system 100 include the following. First, the head pose $P_t$ can be determined by examining various features (for instance the eyes, mouth, nose, etc.) of the head 108 and their positions and orientations relative to one another. Secondly, the head 108 will at times be seen in profile by some cameras 104, in frontal views (or nearly frontal), back views, and other views by other cameras 104. Some of these views might be relatively rich in information while other views might be relatively poor in information.

For instance, a frontal view of the head 108 typically includes a relatively rich mixture of information. More particularly, the frontal view includes information regarding the orientation and positions of the eyes, nose, mouth and other detectable facial features of the subject 102. Other views, such as a rear view of the head 108, lack information due to the relative sparseness of detectable features visible thereon. Still other views can include some of the information rich facial features and some information-sparse regions of the head 108. Even though the frontal view might be considered rich in information, this characterization is in comparison to the information sparse rear view of the head 108. Compared to many objects which the system 100 can track, though, the head 108 typically exhibits few detectable features (even when viewed from the front).

The scarcity of detectable information associated with the head 108 tends to make head tracking a challenge and maintaining that tracking that much more difficult. Indeed, monocular (single-camera) head tracking systems tend to lose track of the head 108 even when the subject 102 is still. When the subject 102 moves, and particularly, when the subject 102 presents an information sparse view to these monocular systems, their ability to detect and/or track the head 108 degrades further yet. In contrast, embodiments of multi-camera systems 100 disclosed herein track the head 108 even when the subject 102 presents information sparse views to one or more cameras 104 of the system 100.

System 100 makes use of a "temporal continuity" and a "spatial continuity" of the subject 102. In other words, and with regard to the term "temporal continuity," the head 108 as seen by the cameras 104 typically changes head poses $P_t$ by only a small amount from frame-to-frame. Accordingly, the system 100 at times assumes that a head pose $P_t$ detected by one camera in one frame will approximate the head pose captured in a temporally adjacent frame.

Moreover, and with regard to the term "spatial richness," the system 100 at times assumes that the set of views as seen by the cameras 104 will be consistent with each other so long as the cameras 104 remain in the same position relative to one another and the subject 102. Should one camera 104-1, therefore, obtain a frontal view of the subject 102 another camera 104-2 positioned differently relative to the subject 102 might obtain a profile view. Moreover, another camera 104-n at yet another position relative to the camera 104-1 might obtain a rear view. Thus, in general, given constant relative positions of the subject 102 and the cameras 104 and given the type of view obtain by one camera 104, the types of views obtained by one camera 104 can be reliably determined from the types of views obtained by the other cameras 104. This result will occur even if the actual relative positions of the subject 102 and the cameras 104 remain unknown.

Some embodiments use these aspects of the head 108 (and the system 100) to improve detecting the head 108 and, once the head 108 has been detected, determining the head pose $P_t$ and tracking the same. From time-to-time, though, the head 108 might become occluded by other objects. In which case, any one camera(s) 104 might be unable to track or even detect the head 108. In addition, one or more of the cameras 104 might lose tracking should the subject 102 turn and present information sparse views to those cameras 104. Embodiments disclosed herein use information from one or more cameras 104 that is able to track the head pose $P_t$ (at these times) to allow the occluded camera(s) 104 to maintain its focus near where the head 108 is (or will likely soon be). System 100 compares the information from the cameras 104 to corresponding information in the 3D head model 106 to determine the head pose $P_t$. Arrow 112 indicates the correspondence between the information available from the cameras 104 and the information in the 3D head model 106.

In contrast to the variable appearance of the head 108 (as seen by the cameras 104), the 3D head model 106 includes information defining a generic head which usually reflects the features of a large portion of the potential population of subjects 102. For instance, the 3D head model 106 could accommodate variations between individual subjects 102 between the 5th and 95th percentiles (or some other range of percentiles) of a selected population. Since the 3D head model 106 defines pertinent aspects of the subject 102, the 3D head model 106 reflects all views of the head 108 which are potentially viewable by the cameras 104. FIG. 1 illustrates that the 3D head model 106 reflects the frontal view of the head 108 in particular. Furthermore, the 3D head model 106 can be any type of head model including cylindrical, ellipsoidal, generic, morphable, etc. to enumerate a few of the possible types of 3D head model 106. While the 3D head model 106 disclosed herein remains the same through ought the head tracking processes disclosed herein, embodiments in which the head model 106 changes (either in type and/or with regard to the specific information contained therein) are within the scope of the disclosure.

With continuing reference to FIG. 1, each camera 104 typically defines an axis 114 through its focal point and the head 108 (or the center or centroid of the head 108). Thus, the three cameras 104-1 to 104-n define axes 110 which intersect at the head 108 of the subject 102. Each camera axis 114-1 to n (along with one or more other axes which could be selected by a user) defines a coordinate system. Coordinates within one of these camera-related-coordinate-systems can be transformed to coordinates within another of the camera-related-coordinate. One such transformation T12 is illustrated by FIG. 1 to show that coordinates in the coordinate system defined by the camera axis 110-1 can be transformed to coordinates in the coordinate system defined by the camera axis 110-2. A similar situation exists with respect to the 3D head model 106 which has its own coordinate system.

During certain operations, the system 100 selects one of the coordinate systems and transforms coordinates in the other coordinate systems into the selected coordinate system. In one embodiment, the system 100 chooses the coordinate system of the first camera 104 that detects the head 108 (or a head pose $P_{nt}$ thereof) as the basis for at least some of the processing disclosed herein.

Figure 2:
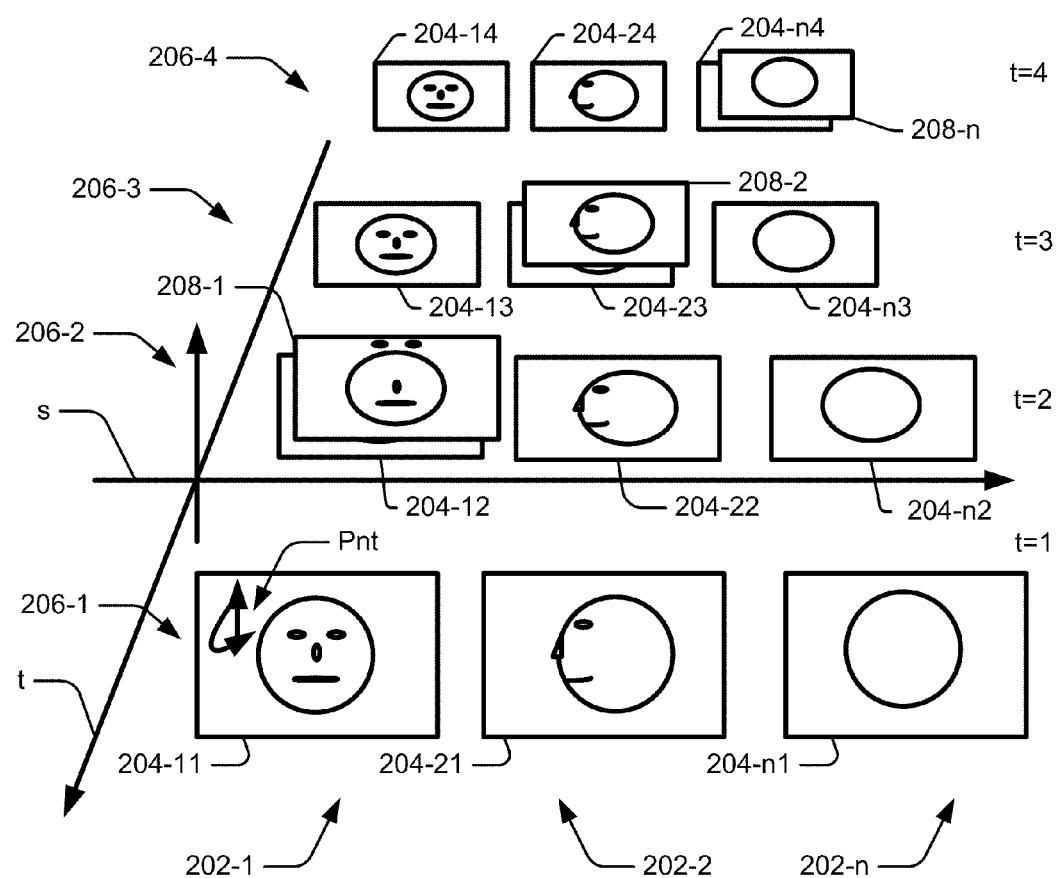
FIG. 2 is an illustrative schematic diagram of images of a subject.

FIG. 2 is an illustrative schematic diagram of images 202 of the subject 102. More particularly, FIG. 2 illustrates three sets of images 202-1 to 202-n obtained from the cameras 104-1 to 104-n respectively. Each image 202 includes frames 204 captured at times t1-4 (i.e., frames 204-11, 204-12, 204-13, 204-14, 204-21, 204-22, 204-23, 204-24, 204-n1, 204-n2, 204-n3, and 204-n4). As implied from the foregoing, a frame 204 is a static image (of a potentially dynamic scene) captured at a particular time t by a camera 104-$n$. Thus, FIG. 2 illustrates the frames 204 as being distributed along a temporal axis t and a spatial axis s (which might reflect up to the three spatial axes relative to which the subject 102 and cameras 104 are arranged).

As illustrated, for short intervals between times t, the individual frames 204 within a given image 202 will typically be similar because of the temporal continuity of the subject 102. Herein, the term "smoothness" indicates that the frames 204 within any set of images 202 change in small increments during relatively small time frames as illustrated in FIG. 2. More particularly, image 202-1 happens to include frames 204-11, 204-12, 204-13, and 204-14, capturing generally frontal views, another image 202-2 includes frames 204-21, 204-22, 204-23, and 204-24 capturing generally side views, and another image 202-$n$ includes frames 204-$n$1, 204-$n$2, 204-$n$3, and 204-$n$4 capturing generally rear views of the subject 102.

Thus, the system 100 usually detects incremental changes in the head pose Pt of the subject 102 between the various frames 204. Mathematically, the detected head poses can be represented by $P_{nt}$ where "n" designates the camera 104 which detected the head pose (or rather captured the frame 204 in which the head pose $P_{nt}$ appears) and "t" designates the time at which that particular head pose $P_{nt}$ was captured in that frame 204. Thus, $P_{12}$ designates the head pose detected by camera 104-1 at time t=2. Note that these even those these individual head poses $P_{nt}$ are visible in the frames 202-$nt$ they are not specifically referenced in FIG. 2 to avoid obscuring other aspects of FIG. 2.

With continuing reference to FIG. 2, for times t=1 to 4, FIG. 2 illustrates that image 202-1 taken by camera 104-1 capture head poses $P_{11}$ to $P_{14}$. Likewise, images 202-2 and 202-$n$ include frames 204-2$t$ capturing poses $P_{21}$ to $P_{24}$ and $P_{n1}$ to $P_{n4}$ respectively. Furthermore, since all frames 204 captured at a particular time t, say time t=3, are taken in close temporal proximity to each other, these head poses $P_{13}$, $P_{23}$, and $P_{n3}$ correspond to each other and may, in fact, be time stamped with a common time stamp. Even though each head pose $P_{nt}$ captured at a particular time t and by the various cameras 104 will differ according to the position of the respective cameras 104, all of these poses $P_{13}$, $P_{23}$, and $P_{n3}$ correspond to an actual head pose $P_3$ (or more generally $P_t$) which the head 108 assumes and is therefore common to all of the cameras 104. Accordingly, at any time t, temporal set 206 of the frames 204 will reflect the head pose $P_t$ at that time t. FIG. 2 therefore illustrates several temporal sets 206-1, 206-2, 206-3, and 206-4 of frames 204 from across the various images 202.

FIG. 2 also illustrates certain key-frames 208-1, 208-2, and 208-3. The key-frames 208 arises from frames 204 for which the head pose $P_{nt}$ has been estimated with a confidence sufficiently high to be deemed an accurate representation of the actual head pose $P_t$ of that time t as seen by that camera 104.

Figure 3:
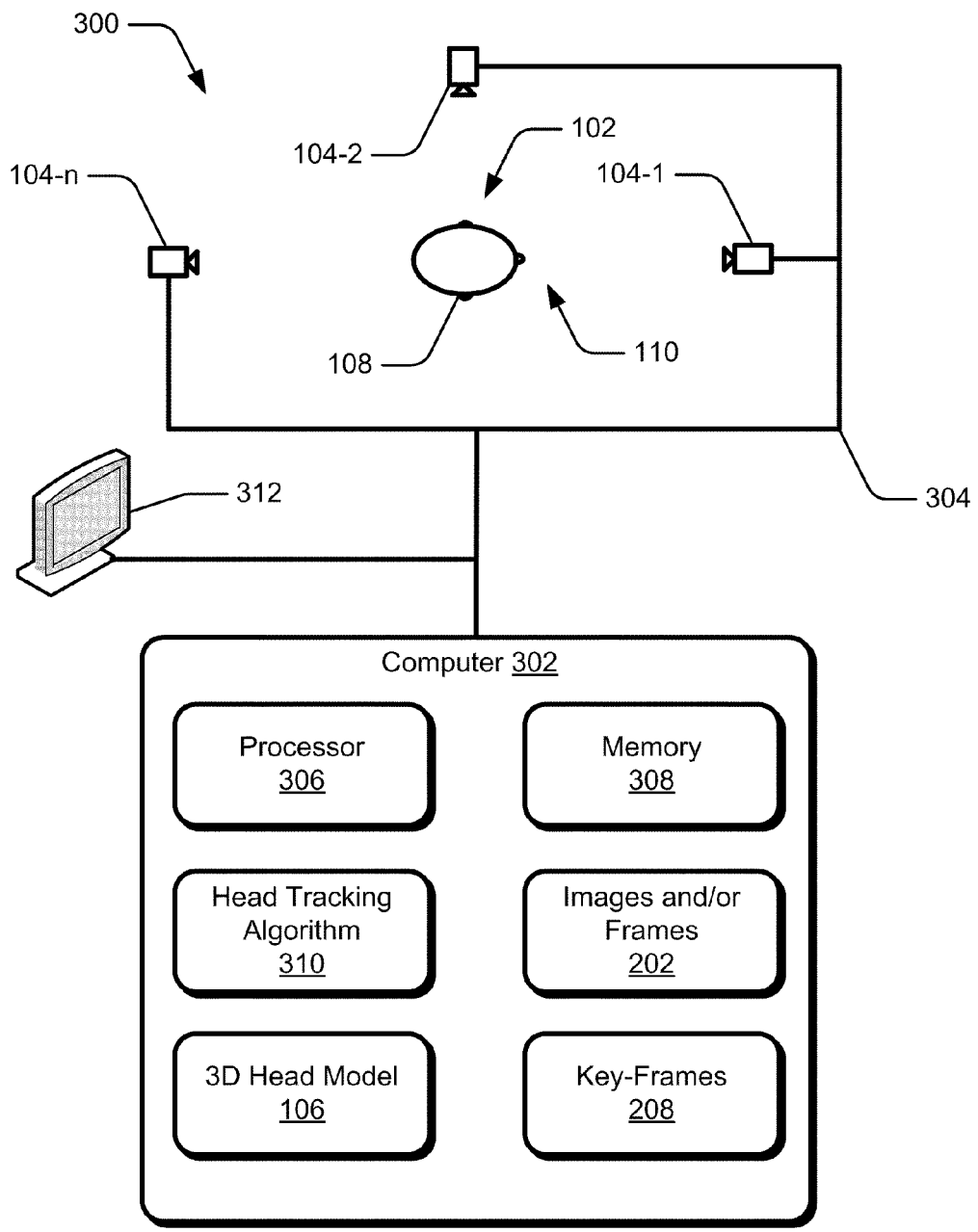
FIG. 3 is an illustrative block diagram of a multi-camera head tracking system.

FIG. 3 is an illustrative block diagram of another multi-camera head tracking system 300. More specifically, FIG. 3 illustrates the subject 102, the cameras 104 disposed about the subject 102 and viewing the same, a computer 302 and a communications link 304 (wireless, hardwired, etc.) between the cameras 104 and the computer 302. The computer 302 includes a processor 306 and a memory 308 which are in communication with each other and with the cameras 104 via the communications link 304.

The processor 306 can be any type of circuit capable of detecting and tracking the head 108 of the subject 102 (or other objects) in the sets of images 202 as disclosed herein. For instance, the processor could be a microprocessor, an application specific integrated circuit (ASIC), a neural network, etc. In some embodiments, the processor 306 executes a head tracking algorithm 310 which the memory 308 stores in the form of processor readable instructions. The memory 308 includes any of the various types of processor readable media capable of storing the 3D head model 106, the individual frames 204 in the images 202, the instructions of the head tracking algorithm 310, and key-frames 208 which are associated with the cameras 104. Of course, the foregoing items can be stored in separate memories or together in one common memory 308 as illustrated.

The system 300 also includes a display device 312 in communication with the computer 302 and the cameras 104. Thus, the display device can display images 202 and frames 204 from the cameras 104, as well as the 3D head model 106, key-frames 208. In addition, or in the alternative, the processor display images of the head 106 in which the processor 306 (via the head tracking algorithm 310) tracks the head pose $P_t$ of the head 108. Moreover, the processor 306 can display various intermediate processing results developed by the head tracking algorithm 310 such as certain correspondences between the 3D head model 106, the head 108, various images 202, frames 204, key-frames 208, etc.

Head Tracking Algorithms

Before delving into the mathematics associated with various embodiments, it might be useful to understand at a top level how embodiments of the head tracking algorithm 310 operate. FIGS. 4-8 illustrate aspects of top-level methods associated with the head tracking algorithm 310. At least some of the methods illustrated by FIGS. 4-8 work in conjunction with one another to determine the head pose $P_t$ at time t.

Figure 4:
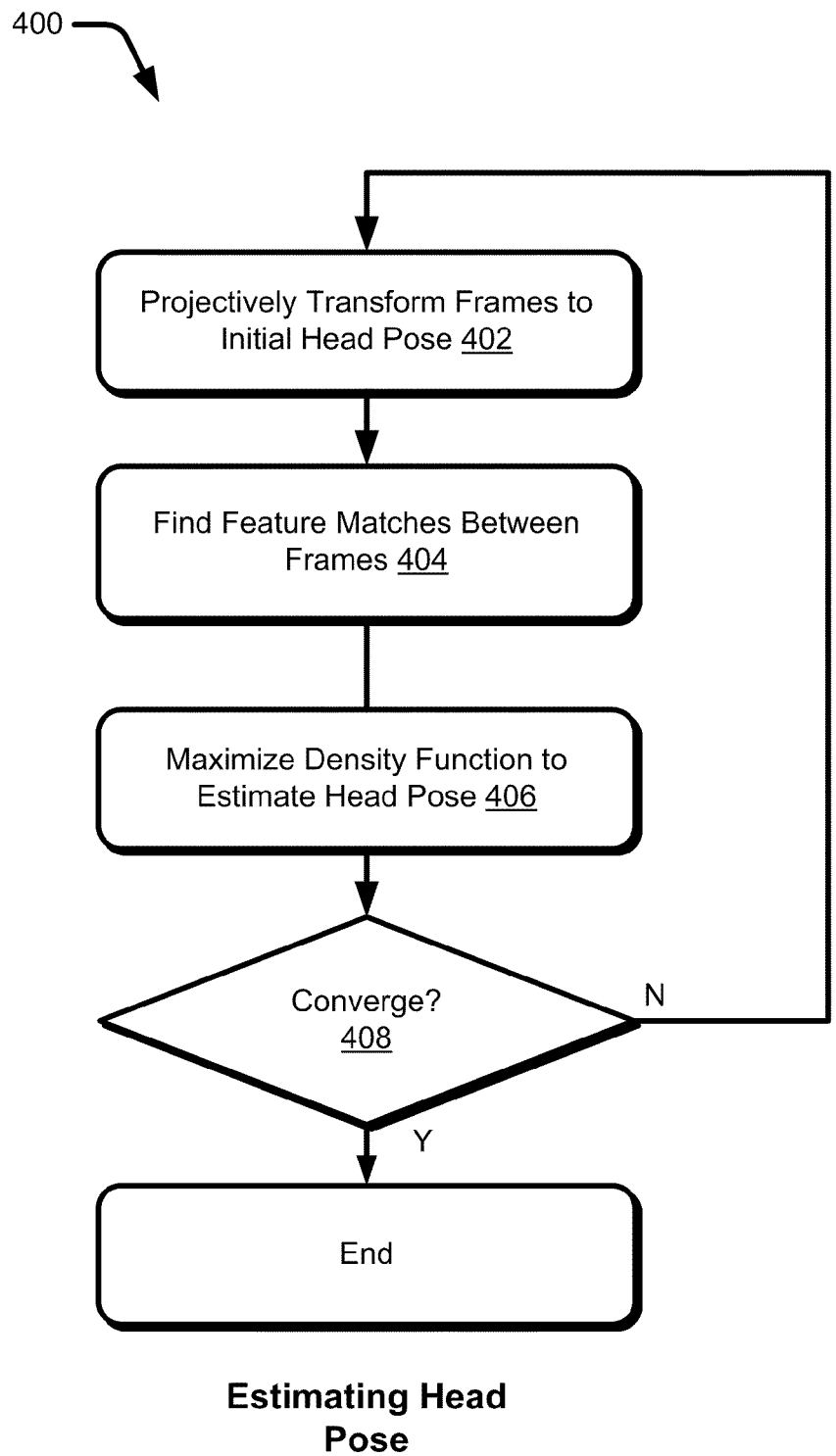
FIG. 4 is an illustrative flow chart depicting a method of estimating a head pose.

FIG. 4 is an illustrative flow chart depicting a method 400 of estimating the head pose $P_t$. (i.e., tracking the head 108).

More specifically, at step 402 the head tracking algorithm 310 projectively transforms each frame 204 to an initial head pose $P_{nt}$.

In step 404 the head tracking algorithm 310 finds feature matches between the various frames 204 captured at time t.

In step 406, the head tracking algorithm 310 maximizes an appropriate density function as further disclosed herein (see Equations A and/or B) to determine an estimate of the head pose Pt.

If the head pose $P_t$ converges to a head pose $P_t$ with sufficient confidence, the head tracking algorithm 310 pauses while waiting for an updated set of images 202 from the cameras 104. However, if the head pose $P_t$ fails to converge, the head tracking algorithm 310 repeats method 400 without waiting. See step 408. If the head pose $P_t$ converges (or as otherwise might be desired), the head tracking algorithm 310 can end method 400 or may wait for another set of frames 204 upon which to execute method 400.

Figure 5:
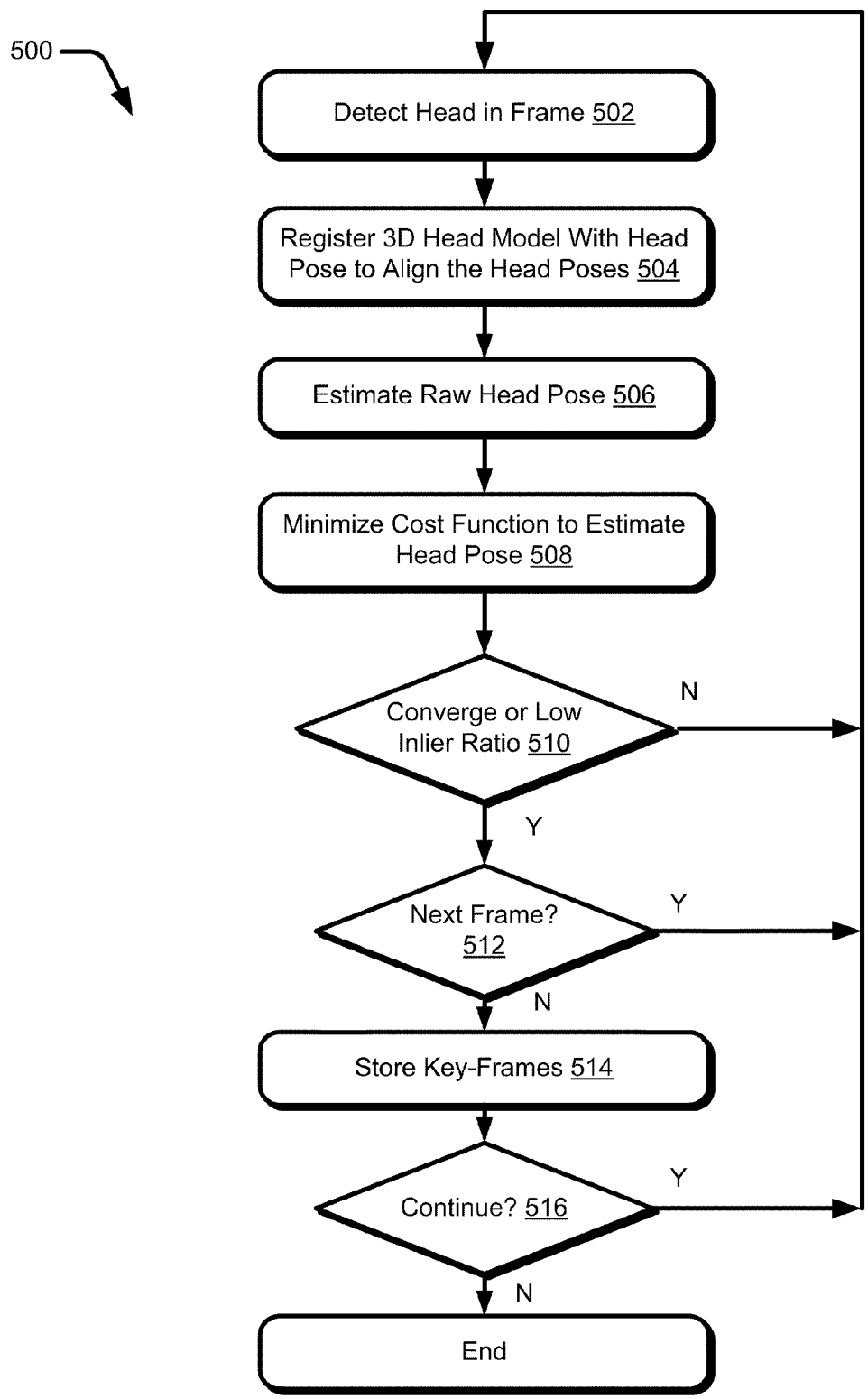
FIG. 5 is an illustrative flow chart depicting a method of aligning multi-camera head poses.

FIG. 5 is an illustrative flow chart depicting a method 500 of aligning, with a common coordinate system, the multiple head poses $P_{nt}$ detected (at a given time t). The common coordinate system can be that of the 3D head model 106, any of the cameras 104, that of the first camera 104 to detect (and track) a head pose $P_{nt}$, etc.

Thus, in step 502, the head tracking algorithm 310 detects the head 108 of the subject 102 in the frame 204 that it is currently being processed.

In step 504, the head tracking algorithm 310 registers the 3D head model 106 with the head (as captured in the frame 204). The results of doing so include being able to relate feature related information in one frame 204 with feature related information in another frame 204 captured at about the same time as the other frame 204. Moreover, the registration process provides a set of relative head poses (between the cameras 104) and/or coordinate transformations which define the camera related geometry of the system 300. Thus, step 504 aligns the head poses $P_{nt}$ with a common coordinate system.

In the current embodiment, the head tracking algorithm 310 registers the 3D head model 106 with the 2D image of the head 108 detected in the frame 204. See step 504.

Having registered the 3D head model 106 with the detected head poses $P_{nt}$, the head tracking algorithm 310 estimates (from the relative poses and/or the coordinate transformations that successfully registered the 3D head model 106 with the frames 204) a raw head pose $P_t$ based on the frame 204 as shown by step 506. The method 600 of FIG. 6 corresponds to step 506 of method 500 and shows that step in further detail. Thus, FIG. 6 will be discussed at this time.

Figure 6:
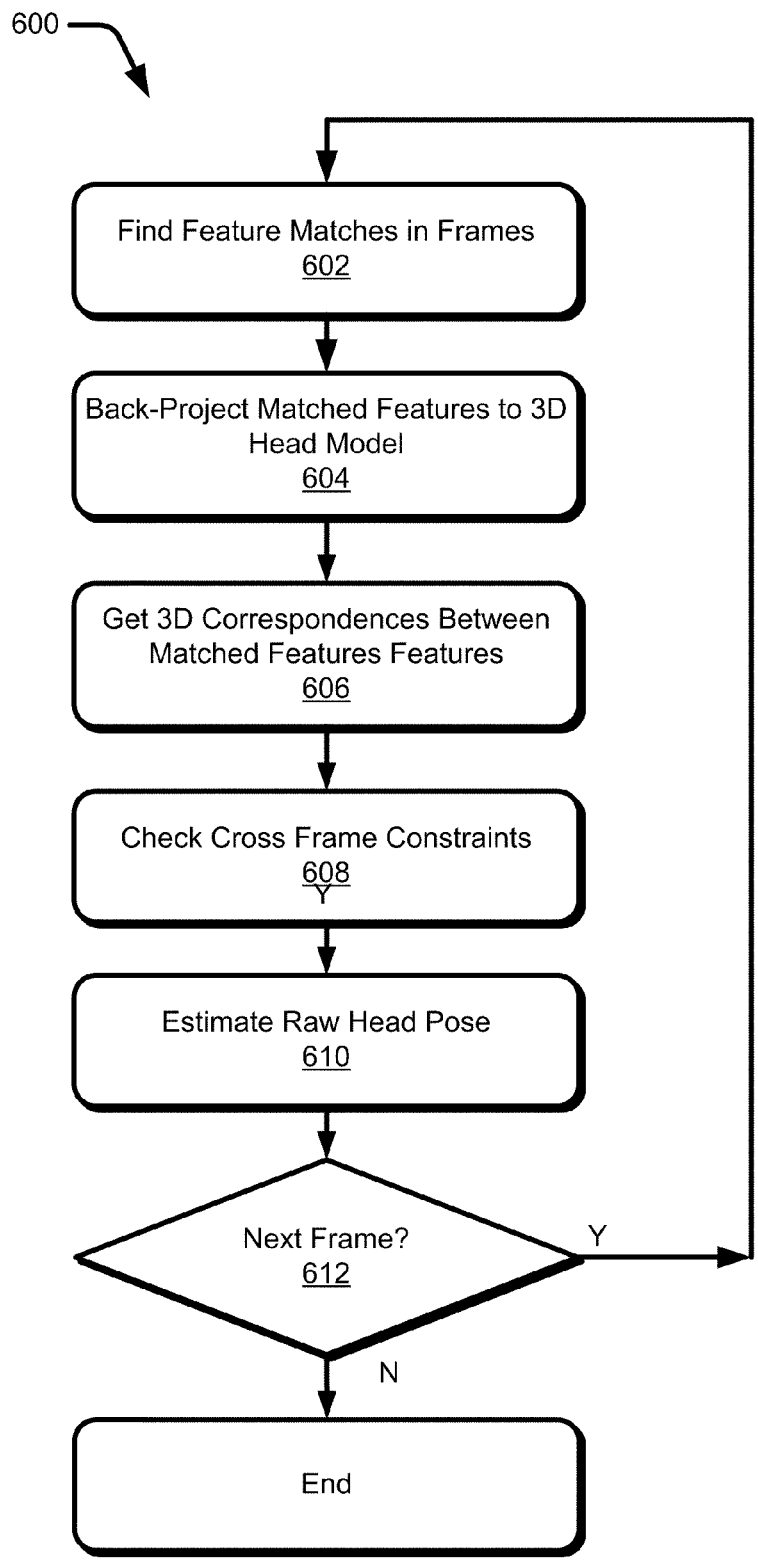
FIG. 6 is an illustrative flow chart depicting a method of estimating a raw head pose.

FIG. 6 is an illustrative flow chart depicting a method 600 of estimating a raw head pose $P_t$. Method 600 (i.e. step 506) includes finding feature matches between the frames 204 captured at a time t to align the detected head poses $P_{nt}$ with one another.

In step 604, the head tracking algorithm 310 back-projects these matched features onto the 3D head model 106.

The head tracking algorithm 310 also obtains various 3D correspondences between the various frames 204 captured at the time t. See step 606.

The head tracking algorithm 310, in step 608, checks various cross-frame constraints between the various frames 204 to verify that the correspondences are likely to produce (with sufficient confidence for further consideration) a raw head pose $P_t$. If the correspondences satisfy the cross-frame constraints, processing continues. Otherwise the head tracking algorithm 310 can wait for another set of frames 204 to be captured at time t+1 for the next iteration of the raw head poses $P_t$.

If the cross-frame constraints are satisfied, in step 610 the head tracking algorithm 310 estimates the raw head pose $P_t$ based on the current frame 204.

If additional frames 204 captured at time t are available, the head tracking algorithm 310 repeats method 600 for the next frame(s) 204. If no more frames 204 remain to be processed, the head tracking algorithm 310 returns to method 500. See step 612.

Thus, at step 508 of method 500 (see FIG. 5), the head tracking algorithm 310 minimizes an appropriate cost function (see Equation C below) to obtain a set of relative poses between the frames 204 captured at time t. These relative poses estimate the transformations which convert one head pose $P_{nt}$ observed by one camera 104 to another head pose $P_{nt}$ observed by another camera 104 (as observed at about time t in frames 204). Moreover, the head tracking algorithm 310 also makes an estimation of the actual head pose $P_t$ collectively observed by the cameras 104 by minimizing the cost function in step 508.

If the estimated head pose $P_t$ fails to converge in step 508, the head tracking algorithm 310 repeats steps 502, 504, 506, and 508. Or in the alternative, or in addition, if the ratio of frames 204 which have a detected head pose $P_{nt}$ which lies within a reasonable distance from the estimated actual head pose $P_t$ to the total number of frames 204 at time to is too low, the head tracking algorithm can repeat steps 502, 504, 506, and 508. See step 510. If, instead, the estimated head pose $P_t$ converges and/or the inlier ratio is satisfactory, the head tracking algorithm 310 continues at step 512.

At step 512, the head tracking algorithm 310 determines whether any frames 204 captured at time t remain to be processed. If so, the head tracking algorithm 310 repeats steps 502, 504, 506, 508, and 510 to refine the estimated head pose $P_t$ based on these additional frames 204.

Otherwise, and if the head tracking algorithm 310 includes functionality for identifying (during the foregoing processing) key-frames 208, the head tracking algorithm 310 stores the key-frames 208 for use during the next iteration of method 500. See step 514.

The method 500 may then loop or end as may be desired. See step 516.

Figure 7:
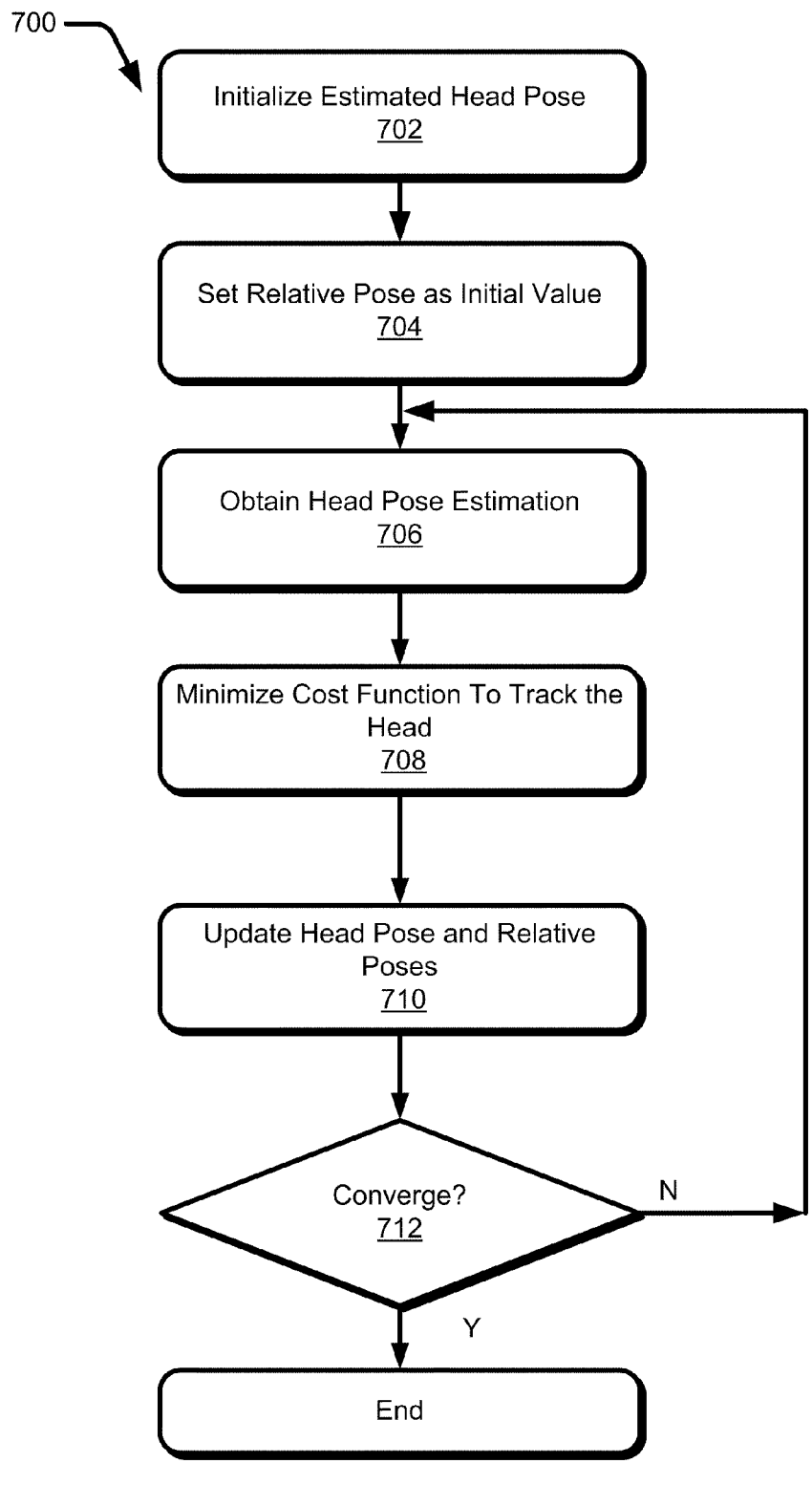
FIG. 7 is an illustrative flow chart depicting a multi-camera head tracking method.

FIG. 7 is an illustrative flow chart depicting a multi-camera head tracking method 700 in which information from frames 204 captured at earlier times (such as time t−1) is used to refine the estimate of the head pose $P_t$. When beginning method 700 (or as otherwise desired), the head tracking algorithm 310 performs step 702 in which it initializes the estimate of the head pose $P_t$.

In step 704, the head tracking algorithm 310 sets a relative pose between the to-be-determined head pose $P_t$ and a previously determined head pose $P_{t-1}$. Of course, when head tracking algorithm 310 executes the method 700 for the first time, no previous head pose $P_{t-1}$ estimate will exist so some default or user supplied value can be used for the head pose $P_{t-1}$ estimate In step 706, the head tracking algorithm 310 obtains an estimate for the head pose $P_t$ using: the initial estimate for the head pose $P_t$, the initial relative pose, information regarding a state of the system 300 (and subject 102) at time t−1 and certain key-frames 208 (as disclosed further herein). Moreover, step 706 is further disclosed with reference to method 800 of FIG. 8. Thus, FIG. 8 will now be discussed.

Figure 8:
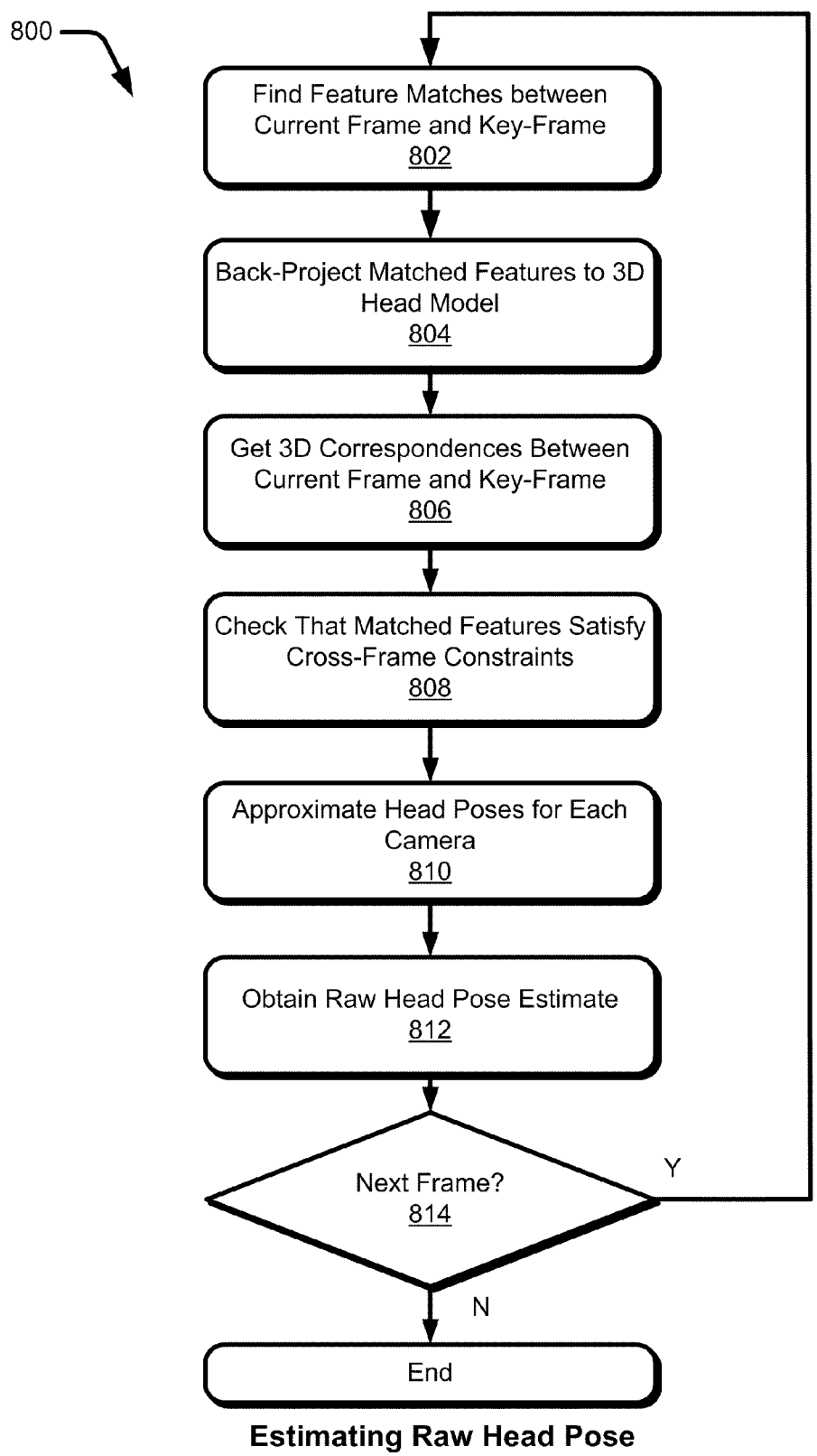
FIG. 8 is an illustrative flow chart depicting a method of estimating a raw head pose.

FIG. 8 is an illustrative flow chart depicting a method 800 of estimating a head pose $P_t$ in accordance with step 706 of FIG. 7. More particularly, FIG. 8 illustrates that the head tracking algorithm 310 finds feature matches between the current frame 204 being processed and the key-frame(s) 208 captured at time t−1 (or earlier). See step 802.

At step 804 the head tracking algorithm 310 back-projects these matched features onto the 3D head model 106.

From information developed during the back-projection of the matched features, the head tracking algorithm 310 obtains correspondences between the features between the current frame 204 and the key frame 208. See step 806.

At step 808, the head tracking algorithm 310 checks that certain cross-frame constraints are satisfied by the matched features. Should some of these matched features appear to violate the cross-frame constraints, the head tracking algorithm 310 removes these outliers from further consideration.

In step 810, the head tracking algorithm 310 obtains an estimate of the head pose $P_t$ associated with the set of inlaying feature matches between the current frame 204 and the key-frame 208. In some embodiments, the head tracking algorithm 310 determines the estimate of the head pose $P_t$ using an iterative method such as a POSIT (Position From orthogonal and Scaling With Iterations) algorithm (see P. David, D. Dementhon, and R. Duraiswami, *Simultaneous pose and correspondence determination using line features*, pages 424-431, 2002).

Moreover, head tracking algorithm 310 estimates the raw head pose $P_t$ in step 812 by applying a RANSAC (random sample consensus) or other type of estimation method to the current estimate of the head pose $P_t$ (determined in step 810).

In step 814 of the current embodiment, the head tracking algorithm 310 determines whether additional frames 204 remain to be processed. If so, the head tracking algorithm 310 repeats steps 802, 804, 806, 808, 810, and 812 for the remaining frame 204. See step 814. Otherwise, the head tracking algorithm 310 returns to the method 700.

More particularly, the head tracking algorithm 310 minimizes an appropriate cost function (often using Levenberg Marquadt techniques) such as Equation C (see below) in step 708. From the results of minimizing the cost function, the head tracking algorithm 310 obtains updated relative poses and an updated estimate for the head pose $P_t$. See step 710.

At step 712, the head tracking algorithm 310 determines whether the method 700 has converged on an estimate of the head pose $P_t$. If not, the method 700 repeats steps 702, 704, 706, 708, and 710. If so, the head tracking algorithm can end processing in accordance with method 700 or can wait for more frames 204 to process.

Thus, top-level methods 400, 500, 600, and 700 have been disclosed for tracking a head 108 using a multi-camera head tracking system such as system 300 of FIG. 3. With reference now to the mathematical treatment of the methods illustrated by FIGS. 4-7, certain alphabetic references will be hereinafter used to refer to certain aspects of FIGS. 1-7 so that these aspects can be represented in pertinent equations.

As discussed previously, embodiments of the head tracking algorithm 310 of FIG. 3 employs spatial richness and temporal continuity as well as key-framing to track the head 108 of the subject 102. Furthermore, embodiments of the head tracking algorithm 310 employ Bayesian head pose estimation to achieve robust 3D head tracking. As noted herein, the estimate of the actual head pose $P_t$ of the subject 102 at a time t corresponds to various detected poses $P_{1t}$, $P_{2t}$, and $P_{nt}$. Moreover, these detected head poses $P_{1t}$, $P_{2t}$, and $P_{nt}$ together also correspond to a state $X_t$ of the system 100 and the subject 102 at time t. Thus, the state $X_t$ includes information regarding the to-be-determined actual head pose $P_t$ of the subject 102 at time t.

To determine the actual head pose $P_t$, the head tracking algorithm 310 gathers frames 204 at various times t (for instance times t=1 to 4) from the cameras 104. These frames 204 therefore have captured therein head poses $P_{11}$, $P_{12}$, $P_{13}$, $P_{14}$, $P_{21}$, $P_{22}$, $P_{23}$, $P_{24}$, $P_{n1}$, $P_{n2}$, $P_{n3}$, and $P_{n4}$. To detect these head poses $P_{nt}$ and to track the head 108, the head tracking algorithm 310 solves a Bayesian posterior distribution $P(X_t|X_{t-1}, I_t)$ where $I_t$ includes the images 202 (including the frames 204). Since any given state $X_t$ of the system 100 (and subject 102) includes information regarding the actual head pose $P_t$ at the time t, solving for the state $X_t$ yields the actual head pose $P_t$ (or an estimate thereof) at time t. The head pose Pt (as determined by the head tracking algorithm 310) can be deemed a new head pose Pt since the head tracking algorithm 310 derives it from one or more previous head poses, for example pose $P_{t-1}$. More particularly, the head tracking algorithm 310 derives the head pose $P_t$ in accordance with the motion of the head 108 detected at previous times t−1, t−2, t−3 and so forth by the cameras 104. Furthermore, as the number of cameras 104 in the system 100 increases, the smoothness of the determined head pose $P_t$ increases and its sensitivity to errors and inaccuracies in the detected head poses $P_{nt}$ decreases.

Some embodiments include features to detect, select, and use key-frames 208 to eliminate drift from the system 300 and/or for other reasons. More particularly, the head tracking algorithm 310 of some embodiments selects appropriate key-frames 208 using the frame alignment techniques incorporated therein. The head tracking algorithm 310 of these embodiments use a combination of active appearance method (AAM) and active shape modeling (ASM) techniques to provide correspondence between a 2D (two-dimensional) point set v of the head 108 captured in the various frames 204 and a 3D vertex point set U which defines the head model 106. It might be worth noting that the particular points $v_k$ captured in the 2D frames 204 satisfy the condition:

$$v_k \in v \qquad (1)$$

That being said, the head tracking algorithm 310 compares potential features of the subject 102 with the head model 106 to determine whether the frames 204 contain features such as those detected in the head model 106. More particularly, to determine whether a feature match exists, the head tracking algorithm 310 measures the projection errors associated with the points $v_k$ in the 2D frames 204 by comparing these captured points $v_k$ to the 3D vertex points U which define the head model 106.

Thus, once the projection errors are determined, the head tracking algorithm 310 identifies whether the frame can be used as a key-frame 208 by solving the equation:

$$e(v,U,P)^2 = \Sigma_{v_k \in v, U_k \in U} \rho(\|v_k \phi(A|R|t|U_k)\|^2) \qquad (2)$$

Or, expressed differently:

$$e(v,U,P)^2 = \Sigma_{v_k \in v, U_k \in U} \rho(\|v_k - \phi_2(A\phi_3(QU_k))\|^2) \qquad (3)$$

In the foregoing equations, A represents the intrinsic matrix of the pertinent camera 104 and can be obtained offline and/or in advance. R is the rotation parameter of the pertinent camera 104 and t is the translation parameter of that camera 104. The head pose P and 3D vertex point set U are represented in homogenous coordinates and φ denotes a projection from an n-d homogenous coordinate system to an n-d Euclidean coordinate. Additionally, σ is an M-estimator chosen to resist high noise inference. Moreover:

$$Q = \begin{matrix} R & t \\ 0 & 1 \end{matrix} \qquad (4)$$

Thus, for a given frame 204, the head tracking algorithm 310 determines the pose composition and pose difference between a previous, known head pose $P_i$ (corresponding to $P_{nt-1}$) and the new to-be-determined head pose $P_j$ (corresponding to head pose $P_{nt}$). In other words, the head tracking algorithm 310 determines the relative head pose $P_{ij}$ between head poses $P_i$ ($P_{nt-1}$) and $P_j$ ($P_{nt}$). Mathematically these terms are related as follows:

$$P_{ij} = P_j P_i^{-1}, P_{ij} = P_{ji}^{-1}, \text{ and } P_{ii} = I \qquad (5)$$

Moreover, to determine a rigid head pose $P_t$ for a given frame 204, the head tracking algorithm 310 minimizes the projection error sum $e(v, U, P)^2$. In some embodiments, the head tracking algorithm 310 of FIG. 3 uses perspective-n-point (PnP) techniques to do so. In accordance with these PnP techniques, the head pose $P_{nt}$ which is extracted from the frame 204 is deemed to be "rigid" or is said to be known with a relatively high confidence level. Accordingly, the particular frame 204 involved can be deemed a key-frame 208 if the projection error sum $e(v, U, P)^2$ satisfies a selected criteria.

Regardless of the technique used to extract the head pose $P_{nt}$ and/or to designate the frame 204 as a key-frame 208, the head tracking algorithm 310 makes use of the temporal continuity of the pertinent image 202 by assuming that temporally adjacent frames 204 are similar enough that a previous frame $204_{nt-1}$ (or earlier) can be used as a basis for determining the head pose $P_{nt}$ in the current frame $204_{nt}$ or subsequent frames $204_{nt+1}$ (or later images).

It might also be worth noting that the foregoing techniques allow the head tracking algorithm 310 to determine head poses $P_{nt}$ at relatively high frame rates. Moreover, in some embodiments, the foregoing alignment related techniques (alone) allow satisfactory performance. Furthermore, the head tracking algorithm 310 of the current embodiment can be applied to determine key-frames 208 where the subject 102 generally presents a frontal view to a particular camera 104. The current embodiment of the head tracking algorithm 310 can also be applied where the subject 102 avoids occlusions of the subject 102 or where the subject 102 avoids presenting views differing significantly from the frontal view (i.e., a profile view, a rear view, or views between the two). Also, it has been found that the foregoing alignment related techniques also apply well where some observable jitter between temporally adjacent head poses $P_{nt}$ and $P_{nt-1}$ can be tolerated.

Thus, the head tracking algorithm 310 of the current embodiment extracts key-frames 208 for one or more of the cameras 104 from time to time and uses these key-frames 208 to eliminate drift from the head pose $P_{nt}$ associated with each individual camera 104. However, circumstances may exist in which, even with the use of key-frames 208, an individual camera 104 can lose track of the head 108. For instance, the subject 102 can present an information scarce view to the camera 104. In other such situations, the head 108 can move behind another object or otherwise become occluded. Moreover, the subject 102 might move from the field of view of one or more of the cameras 104.

Some embodiments of the head tracking algorithm 310 build upon the foregoing techniques to broaden the applications to which they can be applied. More particularly, various embodiments use information regarding the current head pose $P_{nt}$ associated with one camera 104 to aid other cameras 104 in their tracking of the head 108. In some embodiments, such use of inter-camera information occurs despite having unknown, or uncalibrated camera related geometry.

Generally, the head tracking algorithm 310 of these embodiments operates in two phases. First, the head tracking algorithm 310 associates multiple images 202 (taken by different cameras 104 at the same time t) with each other and then it estimates the new head pose $P_t$ based on feature correspondence between the multiple images 202 using Bayesian techniques, spatial richness, and temporal continuity. More particularly, and as disclosed previously, at any time t the system 300 captures frames 204 from multi-cameras 104 and within which the system 300 attempts to detect the head 108 of the subject 102 and to track the same. The system 300 also extracts key-frames 208 from these images 202 for each camera 104. As time progresses, the system 300 continues performing these actions thereby capturing a time-series set 206 of images I (where I corresponds to the images 202) from the cameras 104; detecting the head 108 therein; detecting the head poses $P_{nt}$; extracting a time-series set of key-frames 208 associated with each camera 104; and estimating the actual head pose $P_t$. Thus, for any time t, the state of the system 300 (and subject 102) can be represented by the state $X_t$ (which reflects the foregoing information).

As alluded to earlier, the head tracking algorithm 310 represents the set of key-frames 208 associated with the cameras 104, and which were extracted at (or shortly before) the time t, as $Y_t$. Furthermore, the head tracking algorithm 310 sets the set of key-frames 208 from time t (or earlier) as $Y_t := \{Y^T\}$ where $Y^T$ is observed by n views $J^T = \{J_1^T, J_2^T, \ldots, J_n^T\}$ (corresponding to frames 204-1t, 204-2t, and 204-nt). The head tracking algorithm 310 also sets $J^t := \{J^T\}$. As discussed previously, the set of views $J^T$ is associated with the actual (high confidence) head pose $P_t$ of the head 108 and a particular state $X_t$ of the system 300 at time t.

According to a Bayesian technique used by the head tracking algorithm 310 of FIG. 3, the posterior distribution of the state $X_t$ of the system 100 is specified by:

$$P(X^t | X^{t-1}, Y^t, I^t, J^t) = P(I^t, J^t | X^t, X^{t-1}, Y^t) P(X^t | X^{t-1}, Y^t) \over P(X^{t-1}, Y^t) P(X^t, Y^t, I^t, J^t)$$ (6)

Furthermore, when the set of key-frames $Y^t$ and the ongoing head tracking results are satisfactory, the head tracking algorithm 310 simplifies the posterior distribution to:

$$P(X^t | X^{t-1}, Y^t, I^t, J^t) \propto P(I^t, J^t | X^t, X^{t-1}, Y^t) P(X^t | X^{t-1}, Y^t)$$ (7)

In some embodiments, the head tracking algorithm 310 assumes conditional independence between the key-frames Yt (associated with different cameras 104 but from about the same time t) thereby allowing it to estimate the corresponding density function as:

$$P(X^t | X^{t-1}, Y^t, I^t, J^t) \approx c P(X^t | X^{t-1}, Y^t) \pi_{v_k^i \in X^{t-1}} P(I^t, I^i | X^i)$$
$$\pi_{Y^T \in Y^t} P(I^T, J^T | X^t, Y^T)$$ (8)

Or expressed differently:

$$P(X^t | Y^{t-1}, Y^t, I^t, J^t) = c P(X^t | X^{t-1}, Y^t) \pi_{Z \in X^{t-1} \cup Y^t, K \in I^{t-1} \cup I^t} P(I^t, K | X^t, Z)$$ (9)

In the foregoing expressions, c is a constant from a uniform simplification of $P(I^t | X^t)$ and which describes the texture consistency likelihood at the time t given the known 3D head model 106 and certain cross camera 104 constraints (disclosed further below). Additionally, Z represents a certain image from either the collection $X^{t-1}$ or $Y^t$, and K represents the corresponding observations. Moreover, the first term of the product is the prediction density of $X^t$ which satisfies a Gaussian distribution with a mean of $P_i^t$ and a covariance $\Sigma$ such that:

$$P(P_i^t | P_{Zj}) = N(P_i^t | \Sigma)$$ (10)

Where the second term denotes the product of the head pose likelihood function represented by Pz as:

$$P(I^t, K | X^t, Z) = P(I^t, K | P^t, P_Z)$$ (11)

In a multi-camera head pose tracking system such as system 300, the head tracking algorithm 310 therefore models the conditional independence of the various detected head poses $P_{nt}$ and the frames 204 from different cameras 104. The head tracking algorithm 310 also expands the product for n cameras 104 to yield:

$$P(I^t, K | X^t, Z) = \pi_{i,j=1,2,\ldots,n} P(I_i^t, K_j | P_i^t, P_{Zj})$$ (12)

Where $P_{Zj}$ is the head pose $P_Z$ detected in the jth view and which can be represented by the pose composition as $P_{Zj} = P_{ij} P_{Zi}$.

Furthermore, the head tracking algorithm 310 defines the head pose likelihood model based on the feature point matches $\{(v_k, u_k)\}$ between $I_i^t$ and $K_j$. As a result, since the head tracking algorithm 310 has already determined the head pose $P_{Zj}$, the head tracking algorithm 310 can back project $\{u_k\}$ onto the head model 106 to obtain the 3D correspondence $\{U_k\}$.

The head tracking algorithm 310 of some embodiments also models an additional condition as:

$$P(I_i^t, K_j | P_i^t, P_{Zj}) \approx P(\{v_k\}, \{U_k\} | P_i^t, P_{Zj}) \propto \exp\left(\left[\frac{e(\{v_k\}, \{U_k\}, P_i^t)^2}{2\sigma^2}\right]\right)$$ (13)

Where, again, e $(\{v_k\}, \{U_k\}, P_i^t)^2$ denotes the squared projection error sum between the set of 2D-3D correspondences. See G. Aggarwal, A. Veeraraghaven, and R. Chellappa. 3D Facial Pose Tracking in Uncalibrated Videos, *Lecture Notes in Computer Science*, 3773:515, 2005.

Multi-Camera Head Tracking System State Model

Figure 9:
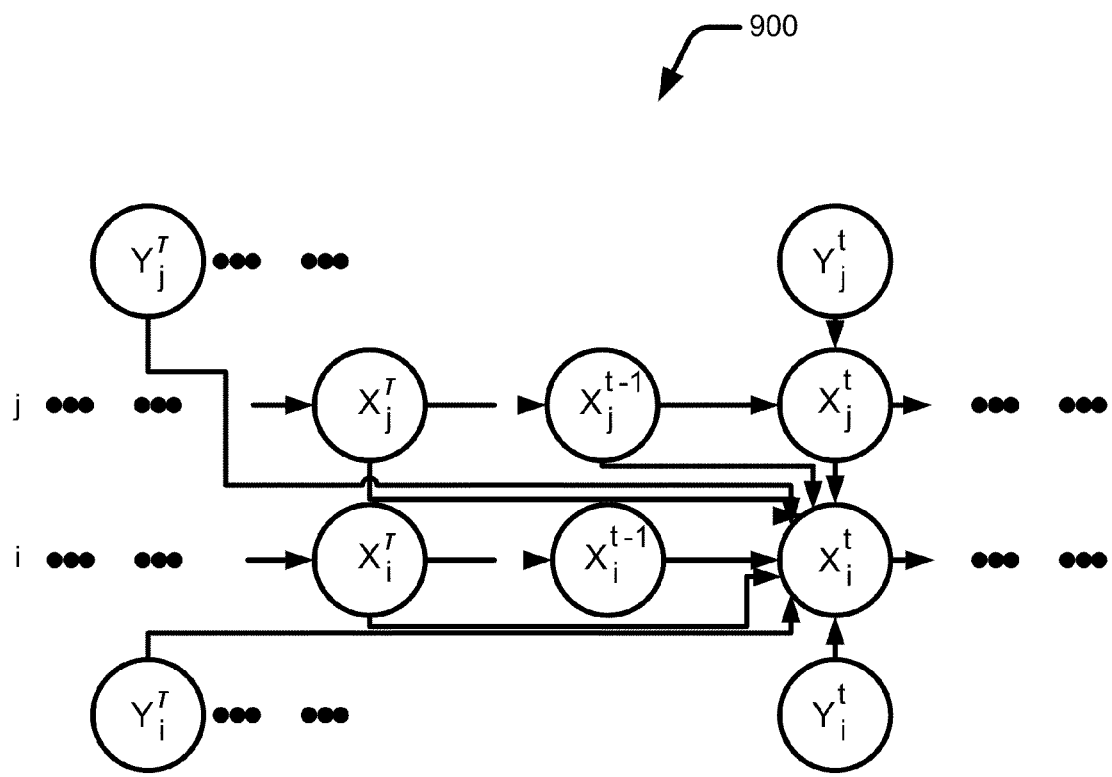
FIG. 9 is an illustrative graphical model for estimating a state of a multi-camera head tracking system.

FIG. 9 is an illustrative graphical model 900 for estimating the current system state $X_t$ from the foregoing information. The graphic model 900 illustrates that the system state $X_t$ can be derived from various pieces of information including, but not limited to various states X of the system 300 (and subject 102) and sets of key frames $Y_t$. Thus, in some embodiments, the graphic model 900 implemented by the head tracking algorithm 310 formulates head tracking as a two part process. In one part, the head tracking algorithm 310 matches two frames 204 captured by differing cameras 104 (but captured at roughly the same time t). In the other part of the processing, the head tracking algorithm 310 estimates the new head pose $P_t$ by determining a maximum a posteriori (MAP) based on feature correspondences. Furthermore, the head tracking algorithm 310 iteratively optimizes the results of the foregoing two part process. Illustrative pseudocode for such a two part process follows:

Input: Initialize the to-be-determined head pose $P_t$ as $P_{t-1}$ or $P_{Zj}$

Output: Refined head pose $P_t$

Repeat

For each image $K_j \in K \in I^{t-1} \cup J^t$ associated with its head pose $P_{Zj}$, do Projectively transform $K_j$ to the initial head pose $P_t$ via a differential pose $P_t P_j^{-1}$ and get $\hat{K}_j$.

Find feature matches $\{(v, u)\}$ between images $I_i^t$ and $\hat{K}_j$.

End

Maximize the density function to update the estimate of the head pose $P_t$.

Until MAP is converged

To maximize the probability of correctly matching features using the algorithm summarized by the foregoing pseudocode, the head pose tracking algorithm 310 defines a cost function based on the projection error for a multi-camera 104 system 300 as:

$$f^2(X^{t-1}, I^{t-1}, Y^t, J^t, I^t, \{P_{1i}\}) = \pi_{i=1}^n \pi_{K \in X^{t-1} \cup Y^t} \pi_{\{v\} \subset I_i^t, \{u\} \subset K_j \in K} e^2(\{v\}, \{u\}, P_{1i} P_1^t) \quad (14)$$

The head tracking algorithm 310 minimizes this object equation (Equation C) to solve for $P_1^t$ and $P_{1i}$, where i is not equal to 1, $\{(v, u)\}$ are image feature matches, and $\{(u, U)\}$ satisfy the projection given the head pose of $K_j$. It might be worth noting that the weights to fuse ratio, temporal space, and key-frame space can be automatically determined by the number of terms in each squared projection error sum $e^2$. The results of minimizing the cost function (Equation C) includes obtaining updated relative poses and an updated estimate of the head pose $P_t$. Note that this is true even if the camera related geometry of the system 300 is uncalibrated, unknown, or has changed since having been calibrated. Indeed, the head tracking algorithm 310 can estimate the camera related geometry from the relative poses and/or the coordinate transformations developed while registering the 3D head model 106 to the various detected head poses $P_{nt}$.

Multi-Camera Head Tracking Algorithm

With reference again to FIG. 3, some embodiments of the head tracking algorithm 310 implement another two-portion process. That two-portion process includes a portion in which the head pose $P_t$ is tracked and a portion in which key-frames are selected according to the current head tracking state (position and orientation). These embodiments may be employed where the head tracking algorithm 310 satisfies a uniform mathematical model. Additionally, these embodiments may be employed where (as is often the case) the frames 204 are captured from a direction associated with a key-frame $Y_t$ which contains relatively sparse information compared to frames 204 captured from other directions. Additionally, these embodiments may be employed where the head tracking algorithm 310 selects key-frames $Y_t$ based on the motion of the subject 102.

Illustrative pseudocode implementing the first portion of the head tracking algorithm 310 is as follows:

Input: Images at time t, the set of images $I^t$, the previous state $X^{t-1}$ and the set of key frames $Y_t$ Output: The new (and refined) head pose $P^t$ If the previously determined head pose $P_i^{t-1}$ is undefined then set $P_i^{t-1}$ to some previous head pose $P_{z1}$ else initialize the previously determined head pose $P_{ij}^t$ to $P_{ij}^{t-1}$.

If the previous relative head pose $P_{ij}^{t-1}$ is undefined then set $P_{ij} = P_j P_i^{-1}$ with a large initial uncertainty else set the relative head pose $P_{ij}^t$ to $P_{ij}^{t-1}$ as the initial value for the relative head pose $P_{ij}$.

Repeat

For each image $Z \in X^{t-1} - 1 \cup Y^t$ do

Find feature matches (v, u) between the image $I_i^t$ and the image $I_{z,j}^t$ and back project features (u) in $I_{Zi}$ onto the 3D model to get correspondences (U)

Remove outliers using cross frame constraints disclosed herein

Estimate the head pose $P_t$ associated with the inlier feature set using techniques such as applying RANSAC to a POSIT approximate head pose $P_t$ estimation associated with each camera 104.

end

Minimize the cost function (Equation C) using the raw head pose and the initial relative head pose.

Update the head pose $P_t$ and the relative poses (as desired) until the error of the cost function (Equation C) converges.

It is intuitive that, with good initial estimates and key-frames $Y_t$, the illustrative process disclosed by the foregoing pseudocode converges quicker than otherwise would be the case. Furthermore, it has been found that this process achieves better head tracking and converges more quickly than other processes heretofore possible. This process can be used in conjunction with a frontal face detection algorithm followed by the use of an ASM (active shape modeling) mesh alignment algorithm to register the 3D head model 106 with the head poses $P_{nt}$ detected in the various frames 204. Pseudocode for an illustrative process for doing so is as follows:

---

Input: The images at time $\tau$, the previous set of images $I^T$ (via $X^{T-1}$), and the set of key-frames $Y^T$ Output: the set of head poses $P^T$ at time t For each image in $I_i^T \in I^T$ do Face detection for each view Register the 3D head model 106 with the detected 2D faces in the frames 204 to an alignment pose for each frame $Z \in X^{T-1} \cup Y^T$ do Find feature matches (v, u) between the image $I_i^T$ and the image $I_{Zj}^T$ Back project the features (u) in the image $I_{Zi}$ onto the 3D model Transform the features into the 3D model coordinate system to get (U)

Estimate a raw head pose $P_t$ using, for instance, the pseudocode implementing the first portion of the head tracking algorithm 310

End

End

Minimize the cost function (Equation C) by, for instance a Levenberg Marquadt algorithm to obtain the estimated head pose $P_t$ and the relative head poses.
Declare failure if the cost at the minimum is higher than a threshold or if the number of inliers is lower than a threshold; otherwise, declare success.

---

Thus, some embodiments perform head tracking using all available frames 204 available from the multiple cameras 104 and during the time frame of interest. These embodiments also use the available key-frames $Y^t$ to smooth the detected motion of the head 108 and to handle situations where the head 108 is occluded as seen from one or more of the cameras 104.

More particularly, once one camera 104 of the multi-camera system 300 detects the head 108 and begins tracking the head pose $P_{nt}$, the head tracking algorithm 310 of the current embodiment determines the head poses $P_{nt}$ that are not (yet) being tracked. To do so, the head tracking algorithm 310 compares the available head pose $P_{nt}$ to the relative head poses (which it previously determined for the other cameras 104) to obtain likely head poses $P_{nt}$ for the currently non-tracking cameras 104. As a result, the head tracking algorithm 310 extends the effective working range within which the cameras 104 individually, and/or as a system 300, can track the head pose $P_t$. Indeed, the effective working range of the system 300 can be the union of the fields of view of each of the cameras 104.

Thus, should the subject 102 move from the field of view of one camera 104, the system 300 can continue tracking the head 108 using the other cameras 104. In the meantime, the system 300 can determine where the subject 102 is located relative to the camera 104 that can no longer view the subject 102. Thus, as the subject 102 moves back toward that camera's field of view, the system 300 can predict where the subject 102 will reappear (relative to that camera 104) and point that camera 104 toward that location. Moreover, the system 300 can handle single (or multiple) camera 104 occlusions in a similar fashion.

Another advantage provided by embodiments of system 300 includes the ability to relate a key-frame $Y^t$ from one camera 104 to views as seen from other cameras 104. For instance, a frontal key-frame 208 observed by one camera 104 can be related to a side view for another camera 104 (even if the camera related geometry is uncalibrated). As a result, system 300 can synthesize an image for one camera 104 from a key-frame 208 from another camera 104 given that key-frame, the alignment of the system 300, and either correspondences U between the cameras 104 or the relative poses between the cameras 104.

Moreover, to provide real-time performance, the head tracking algorithm 310 can execute the algorithms disclosed by Tables 2 and 3 in parallel due to similarities in their optimization techniques. In such embodiments, the alignment optimization processing therein constrains drift that might occur in the absence of the key-frames 208. The head tracking algorithm 310 of these embodiments can therefore operate in parallel with a high frame-rate set of cameras 104 without hardware accelerators, particularly when the feature tracking between each stored frame 204 and the current frame 204 is also executed in parallel. In many cases, the convergence of the algorithms disclosed by Tables 2 and 3 can be guaranteed within 3 (three) iterations due to the quick convergence properties of the Levenberg Marquadt algorithms employed therein (at least when the selected initial estimate for the head pose $P_t$ is reasonably accurate).

Figure 10:
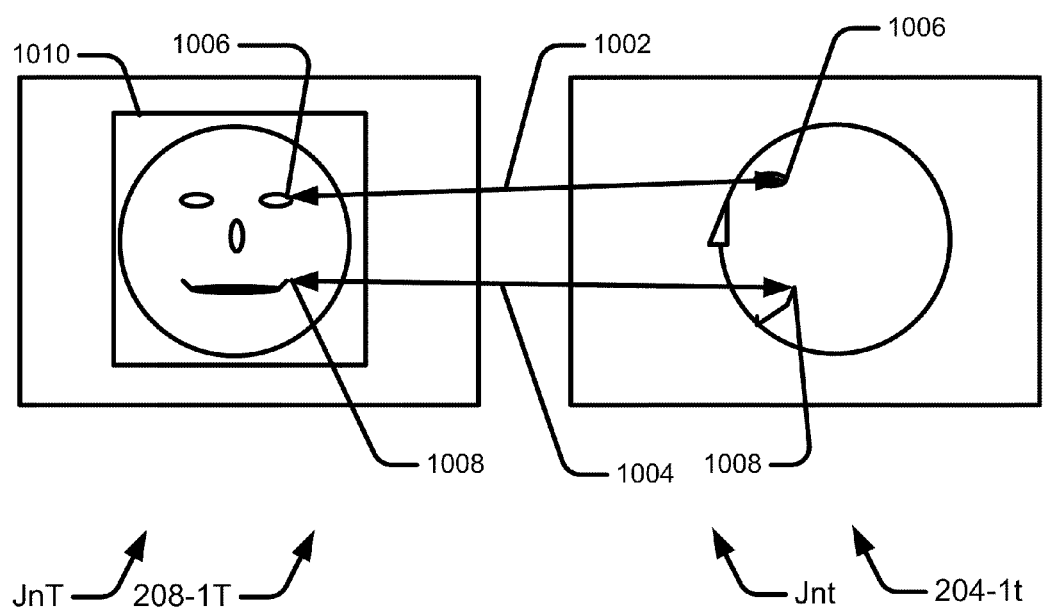
FIG. 10 is an illustrative set of images depicting feature correspondence.

FIG. 10 is an illustrative set of images $J_{nT}$ and $J_{nt}$ depicting feature correspondence over time, between cameras 104$i$ and 104$j$, and between temporally adjacent frames 204 from these cameras 104$i$ and 104$j$. Furthermore, FIG. 10 represents the correspondences 1002 between features as lines 1002 and 1004 drawn between some of the features 1006 and 1008 visible in frame $J_{nT}$ and visible in frame $J_{nt}$. In the illustrative views of FIG. 10 theses features 1006 and 1008 happen to be, respectively, an outside point of an eye of the subject 102 and an outside point of a mouth of the subject 102. Thus, even though the features 1006 and 1008 appear differently in the frames $J_{nT}$ and $J_{nt}$, they represent the same features of the subject and can be said to correspond to one another in these frames.

FIG. 10 also illustrates that at a particular time $\tau$ the system has captured frames $J^T$ of the subject 102. Moreover, the head tracking algorithm 310 has detected a reliable head pose $P_i^T$ for a particular camera 104-$i$ using the alignment techniques disclosed herein. In FIG. 10, as illustrated, it is likely that the frame $J_i^T$ is a frontal view. Of course, at another time t the corresponding frame $J_i^t$ might not be a frontal view. Nevertheless, the system 300 might consider the key-frame $J_j^T$ to still approximate the frame $I_i^t$ (from camera i) closely enough (i.e., enough features may be mapped between the frames $J_j^T$ and $I_i^t$ and therefore correspond to one another) to allow the system 300 to track the head pose $P_i^t$ at time t. In such situations, the relative pose from frame $J_j^T$ to frame $I_i^t$ is given by a composite pose $P_{ji}P_j^t(P_j^T)^{-1}P_{ji}$. Thus, in some embodiments, the key-frame $J_j^T$ of one camera 104$j$ allows head tracking by another camera 104$i$ thereby enhancing the head tracking ranges of the individual cameras 104 as well as that of the system 300.

Cross Camera Constraints

Because of the probabilistic nature of Bayesian techniques, the system 300 of some embodiments assumes that some degree of uncertainty will exist at certain points in the head tracking algorithm 310. For instance, the feature correspondences U (or lack thereof) might lead to uncertainty regarding the conclusion that a given frame 204 contains a particular view (such as a frontal view). As a result, when the head tracking algorithm 310 determines a match between two frames 204 the head tracking algorithm 310 of some embodiments checks the feature consistency between the head poses $P_{nt}$ in each of the frames 204 involved.

Figure 11:
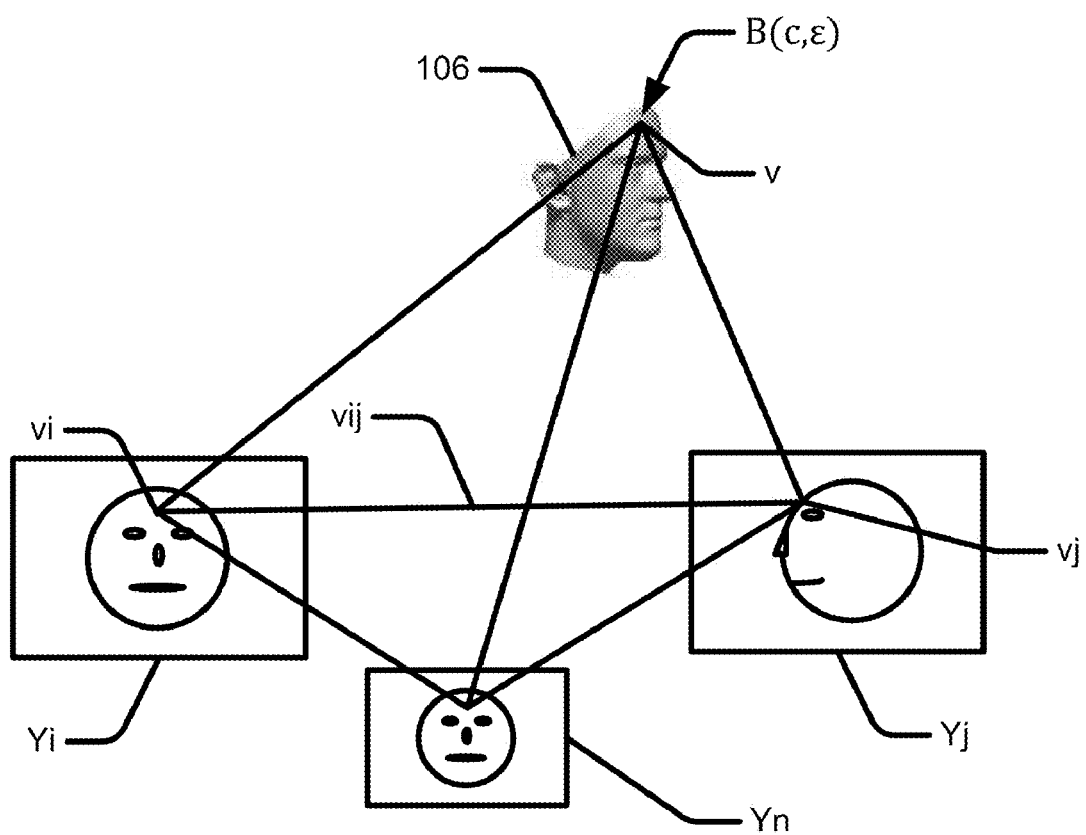
FIG. 11 is an illustrative set of key-frames depicting cross-frame constraints.

FIG. 11 is an illustrative set of key-frames $Y_i$, $Y_j$, and $Y_n$, (at a time t) depicting cross-frame constraints. As illustrated by FIG. 11, the head tracking algorithm 310 checks that the feature matches ($v_i$, $v_j$) as captured by the various 2D images 202 satisfy an epipolar constraint given by:

$$D(v_j, A_j[t_{ij}]_x R_{ij} A_i^{-1} v_i) < \text{threshold}.$$

Where the key-frames Y have correspondences U relative to a head pose $P_{ij}$ and D denotes the 2D Euclidian distance between a point and a line.

For 2D-3D correspondences $\{(v_i, U_i)\}$, the head tracking algorithm 310 of some embodiments assumes that the 3D positions of the feature points vi and vj on the head 108 fall within a small neighborhood B on the 3D head model 106 about where they can be expected to be found. For instance, an eye will likely be located in the upper half of the front of the 3D head model 106) denoted by:

$$U_i \in B(c, \epsilon)$$

Where c is the center of all 3D feature points that satisfy $v_i = v_j = v$ and where corresponding points are indicated by lines such as line vi.

Temporal Constraints

With a dynamic (i.e., time varying) subject 102, the space and temporal complexity becomes more complex than with a relatively static subject 102. To simplify the processing associated with a dynamic subject 102 (and/or system 300), the head tracking algorithm 310 of some embodiments therefore considers certain temporal constraints associated with tracking the head pose $P_t$.

Thus, some embodiments of the head tracking algorithm 310 set a temporal window from which it draws the frames 204 to process, thereby limiting the processing time associated with tracking the head pose $P_t$. These embodiments can also set an aged weight "a" for each set 206 (see FIG. 1) of frames 204 such that only certain temporal sets 206 of frames 204 will be considered in tracking the head pose $P_t$. For instance, if the aged weight "a" satisfies: $0 \leq a \leq 1$, setting the aged weight "a" to 1 causes the head tracking algorithm 310 to consider only the previous temporal set 206 of frames 204 from time t−1 in determining the current head pose $P_t$. Increasing the number of temporal sets 206 of frames 204 that the head tracking algorithm 310 considers increases the accuracy of the system 300 and decreases its sensitivity to image capture errors, head detection errors, etc.

Moreover, in some embodiments, the head tracking algorithm 310 includes a smoothness term $\|P_{ij} - P_{ij}^{old}\|_M^2$ as a stable constraint to avoid divergence in the invariance of $P_{ij}$ of the estimated head pose $P_t$ within the temporal window for the time t. In the current embodiment, $P_{ij}^{old}$ denotes the initial estimate or the value of the head pose $P_t$ from the last iteration of the head tracking algorithm 310. Moreover, the term $\|\text{argument}\|_M$ denotes the Mahalanobis distance which is given by:

$$\|P_{ij} - P_{ij}^{old}\|_M^2 = (P_{ij} - P_{ij}^{old})^T \Lambda_{P_{ij}-1}(P_{ij} - P_{ij}^{old}) \quad (17)$$

Where $\Lambda_{P_{ij}}^{-1}(P_{ij} - P_{ij}^{old})$ denotes the uncertainty of the old estimate of the relative pose $P_{ij}^{old}$.

Moreover, the head tracking algorithm 310 of some embodiments uses a cost function, given by Equation D, to minimize both the head pose $P_{nt}$ estimation errors and the uncertainty of the relative head poses:

$$f^2(X^{t-1}, I^{t-1}, Y^t, J^t, I^t, \{P_{1i}\}) = \qquad (18)$$

$$\sum_{i=1}^{n} \sum_{K \in Y_t\{I\}} \sum_{\{v\} \subset I_i^t, \{u\} \subset K_j \in K} e^2(\{v\}, \{U\}, P_{1i}P_1^i) +$$

$$\sum_{i=1}^{n} \sum_{\tau=0}^{t} a^{t-\tau} \sum_{\{v\} \subset I_i^t, \{u\} \subset I_j^\tau \in I^\tau} e^2(\{v\}, \{U\}, P_{1i}P_1^i) +$$

$$\sum_{i \neq 1} \|P_{1i} - P_{i1}^{old}\|_M^2$$

From Equation D, the head tracking algorithm 310 computes the Equation uncertainty $\Lambda_{P_{ij}} = (J_{P_{i1}}^T J_{P_{i1}})^{-1} = J_{P_{i1}}^{-1} J_{P_{i1}}^{-T}$ where $J_{P_{i1}}$ is the Jacobian matrix $\delta f / \delta P_{1i}$ which can be a first order approximation with a small difference $f(P_{1i} + \delta_{1i}) = f(P_{1i}) + J_{P_{1i}} \delta_{Pi1}$.

Experimental System and Results

An experimental system was set up using a dual core 3.00 GHz processor and multiple Logitech VX9000 web-cameras 104 with image sizes of 320×240 pixels. A generic 3D head model 106 with 182 vertices and 420 edges (to enlarge the head tracking range over that previously achievable) was used for facial feature alignment. The experiment used a 24 fps frame rate and an average camera capture rate of 30 fps.

Moreover, a hexagonal crown was attached to the head 108 of the subject 102 to obtain ground truth estimates for the detected head poses $P_{nt}$ as well as the head pose $P_t$ estimate. The hexagonal crown included a high contrast pattern on its surfaces to improve the accuracy of the ground truth estimates. These ground truth estimates were obtained by independently minimizing the squared projection error sum at each view. Doing so allowed a satisfactory estimate of the geometry between the cameras 104 (using the relative poses found as the head tracking algorithm registered the 3D head model 106 with the frames 204 captured by the various cameras 104). Mismatches between the ground truth estimates and the experimental results occurred only at extreme translations where the ground truth estimates themselves likely exhibit uncertainty. Moreover, even during an experimentally induced severe occlusion of the head, the experimental system managed to track the head post $P_t$ (in terms of translation) reasonably well during most of the occlusion whereas, in comparison, a single-camera system running in parallel with the experimental multi-camera system lost track during essentially the entire occlusion.

Figure 12:
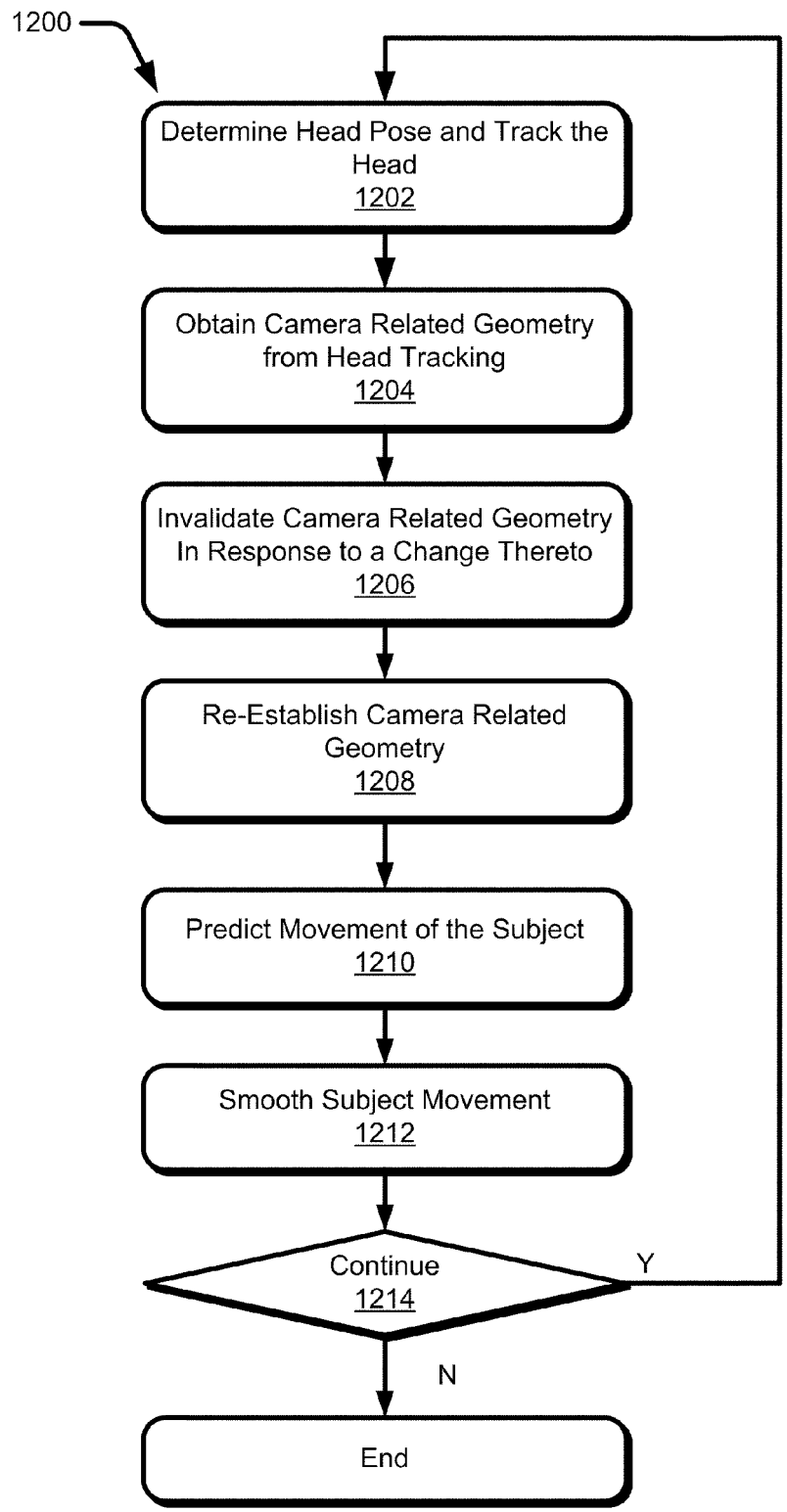
FIG. 12 is an illustrative flow chart depicting a method of calibrating camera related geometry for a multi-camera head tracking system.

FIG. 12 is an illustrative flow chart depicting a method 1200 of determining and using camera related geometry for a multi-camera head tracking system such as system 300. More particularly, FIG. 12 illustrates that the system 300 can determine the head pose $P_t$ of a subject 102 and track the head 108 in step 1202.

In step 1204, FIG. 12 illustrates that the system 300 can obtain the camera related geometry determined from the relative poses or coordinate transformations which successfully registered the 3D head model 106 with various frames 202nt.

At some point, an event might occur which changes one or more aspects of the camera related geometry of the system 300. For instance, a camera 104 could move. Regardless of the cause of the change, the system 300 detects the change (for instance, by detecting that all features of the scene as viewed by a camera 104 move in unison in a manner consistent with movement of the camera 104). In response, the system 300 invalidates the camera related geometry that had been previously determined by the system 300.

In step 1208, the system 300 iterates the head tracking algorithm 310 until it re-calibrates the camera related geometry.

In the current embodiment, once the head tracking algorithm 310 re-calibrates the camera related geometry, the system 300 predicts the movement of the subject 102 (as illustrated by Step 1210). Of course, the system 300 need not wait until the camera related geometry is changed and then re-calibrated to predict such movements. Instead, the system 300 can track the head 108 and predict its movement as desired.

Furthermore, the system 300 can smooth the predicted movement if desired. See step 1212.

If it is desired to continue, the system 300 can repeat the method 1200 (or portions thereof) or end processing in accordance with method 1200 as shown by step 1214.

Thus, embodiments provide real-time head tracking capabilities and the as well as capabilities to estimate camera related geometry of multi-camera head tracking systems. Furthermore, by using various combinations of key-frame tracking and cross-frame feature checking, head tracking algorithms of embodiments remain drift free and possess a large working range.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   detecting a head with a first camera of a plurality of cameras, the head as detected with the first camera being captured in a first detected head image associated with the first camera;
   registering a head model with the first detected head image;
   detecting the head with a second camera of the plurality of cameras, the head as detected with the second camera being captured in a second detected head image associated with the second camera, a geometry between the cameras being uncalibrated;
   back-projecting the second detected head image to the head model;
   determining the geometry between the cameras; and
   determining a head pose of the head from the second detected head image as back-projected to the head model.

2. The method of claim 1 wherein the registering the head model includes rescaling or re-orienting the head model.

3. The method of claim 1 further comprising determining a first key frame of the first detected head image, the first key frame being associated with the first camera, the first key frame being a constraint in the determining the head pose.

4. The method of claim 3 further comprising associating the first key frame associated with the first camera with a corresponding frame of the second detected head image associated with the second camera to establish a second key frame from the corresponding frame, the second key frame being associated with the second camera.

5. The method of claim 4 further comprising:
   detecting a loss of tracking of the head by one of the cameras;
   detecting the head with a third camera of the plurality of cameras, the head as detected with the third camera being captured in a third detected head image associated with the third camera;
   comparing the third detected head image with the registered head model; and
   responsive to the comparing of the third detected head image and the registered head model, establishing a third key frame associated with the third camera.

6. The method of claim 5 wherein the loss of tracking occurs as the head leaves a field of view of the one of the cameras.

7. The method of claim 1 further comprising using knowledge of a smoothness of movement of the head as detected by the first camera and of the geometry between the cameras to predict a movement of the head as detected by the second camera.

8. The method of claim 1 further comprising detecting a movement of the first camera and invalidating a determined geometry related to the first and second cameras.

9. The method of claim 8 further comprising re-determining the head pose by repeating the:
   detecting the head with the first detected head image;
   registering the head model; and
   back-projecting a third detected head image to the head model.

10. The method of claim 9 further comprising using knowledge of a geometry related to the second camera and a third camera and the geometry related to the first and the second cameras to re-calibrate the geometry between the moved first camera and the second camera.

11. The method of claim 1 further comprising:
    detecting a movement of the head with the first camera;
    predicting a movement of the head as seen from a position of the second camera using the movement of the head detected by the first camera; and
    tracking the head with the second camera using the predicted movement of the head.

12. The method of claim 11 wherein the predicted movement of the head will bring the head into a field of view of the second camera.

13. A computing device comprising;
    a display device;
    a processor in communication with the display device and a first camera and a second camera of a plurality of cameras; and
    a memory in communication with the processor and for storing images captured by the cameras and a head model, the memory storing processor readable instructions which when executed cause the processor to:
    detect a head in a first image captured by the first camera,
    register the head model with the detected head in the first image captured by the first camera,
    detect the head in a second image captured by the second camera, a geometry between the first and second cameras being at least initially uncalibrated,
    back project the detected head in the second image to the head model;
    determine the geometry between the cameras;
    determine a head pose of the head from the detected head in the second image as back-projected to the head model; and
    display the head on the display device while tracking the head pose.

14. The computing device of claim 13 wherein the cameras are installed in a teleconferencing facility.

15. The computing device of claim 13 wherein the computing device is a portion of a telepresence based system.

16. The computing device of claim 13 wherein one of the cameras is a handheld camera.

17. The computing device of claim 13 wherein the first camera has a first field of view oriented along a first axis and the second camera has a second field of view oriented along a second axis, the first and second axis of the first and second cameras respectively intersecting at about an expected location of the head.

18. The computing device of claim 17 wherein the processor executable instructions further cause the processor to:
    detect an approximate frontal view of the head in the first image captured by the first camera;
    detect an approximate side view of the head in the second image captured by the second camera; and
    determine an angle between the first and second axis of the first and second cameras.

19. The computing device of claim 18 wherein the head model is a generic head model.

20. A memory including processor executable instructions for a method of tracking a head and which when executed cause the processor to:
    detect a head with a first camera of a plurality of cameras, the head as detected with the first camera being captured in a first detected head image associated with the first camera;

register a head model with the first detected head image by rescaling and re-orienting the head model to fit the first detected head image;

detect the head with a second camera of the plurality of cameras, the head as detected with the second camera being captured in a second detected head image associated with the second camera, a distance and an orientation between the cameras being at least initially uncalibrated;

back-project the second detected head image to the head model;

determine the distance and the orientation between the cameras;

determine a head pose of the head from the second detected head image as back-projected to the head model;

determine a first key frame of the first detected head image, the first key frame being associated with the first camera; and associate the first key frame associated with the first camera with a corresponding frame of the second detected head image associated with the second camera to establish a second key frame from the corresponding frame, the second key frame being associated with the second camera.

* * * * *